United States Patent [19]
Arends et al.

[11] Patent Number: 5,463,211
[45] Date of Patent: Oct. 31, 1995

[54] METHOD AND APPARATUS FOR DETECTING TRANSITIONS IN A TIME SAMPLED INPUT SIGNAL

[75] Inventors: Thomas C. Arends; Randy D. Elliott, both of Eugene, Oreg.

[73] Assignee: Spectra-Physics Scanning Systems, Inc., Eugene, Oreg.

[21] Appl. No.: 58,659

[22] Filed: May 7, 1993

[51] Int. Cl.⁶ .................................................... G06K 7/10
[52] U.S. Cl. ............................................................ 235/462
[58] Field of Search ............................ 307/304, 351, 307/358, 518; 328/150, 164; 235/436, 462, 463

[56] References Cited

U.S. PATENT DOCUMENTS

| | | | |
|---|---|---|---|
| 4,000,397 | 12/1976 | Hebert et al. | 235/61.11 |
| 4,135,161 | 1/1979 | Torrieri | 328/108 |
| 4,697,098 | 9/1987 | Cloke | 307/354 |
| 4,740,675 | 4/1988 | Brosnan et al. | 235/462 |
| 4,749,879 | 6/1988 | Peterson et al. | 307/354 |
| 4,853,802 | 8/1989 | Kukson et al. | 360/65 |
| 5,103,080 | 4/1992 | Barkan et al. | 235/437 |
| 5,103,209 | 4/1992 | Lizzi et al. | 340/572 |
| 5,121,009 | 6/1992 | Braathen | 307/520 |
| 5,272,323 | 12/1993 | Martino | 235/462 |
| 5,304,854 | 4/1994 | Aoki et al. | 307/263 |

OTHER PUBLICATIONS

Hamming, R. W., *Numerical Methods for Scientists and Engineers* (2d ed. 1973), pp. 599–601.
Williams, Arthur, *Filter Design Handbook* (1981), pp. 2–55 to 2–58, 2–60, 2–64, 2–67 to 2–68, 3–15 to 3–19, 7–14 to 7–15, 7–19 to 7–20, 12–58 and 12–67.

*Primary Examiner*—Donald Hajec
*Assistant Examiner*—Jeffrey R. Filipek
*Attorney, Agent, or Firm*—Lyon & Lyon

[57] ABSTRACT

A method and apparatus for determining the transitions between binary levels of an input signal such as a scanned bar code label by detecting zero crossings of an approximated second derivative of the input signal. Samples of the input signal are obtained by using delay lines, sample-and-hold circuits, an analog shift register or similar device. The first derivative of the signal is approximated by the slope of a straight line between two sampled points on the waveform. The second derivative is approximated by the difference between two first derivatives. Zero crossings of the second derivative indicating transitions of the input signal may be determined either by detecting a signal peak on both sides of the zero crossing, or by comparing the second derivative signal to zero when the first derivative exceeds a positive or negative threshold. The time between sample points may be adjusted to match a particular range setting of a scanner having a plurality of range settings.

41 Claims, 35 Drawing Sheets

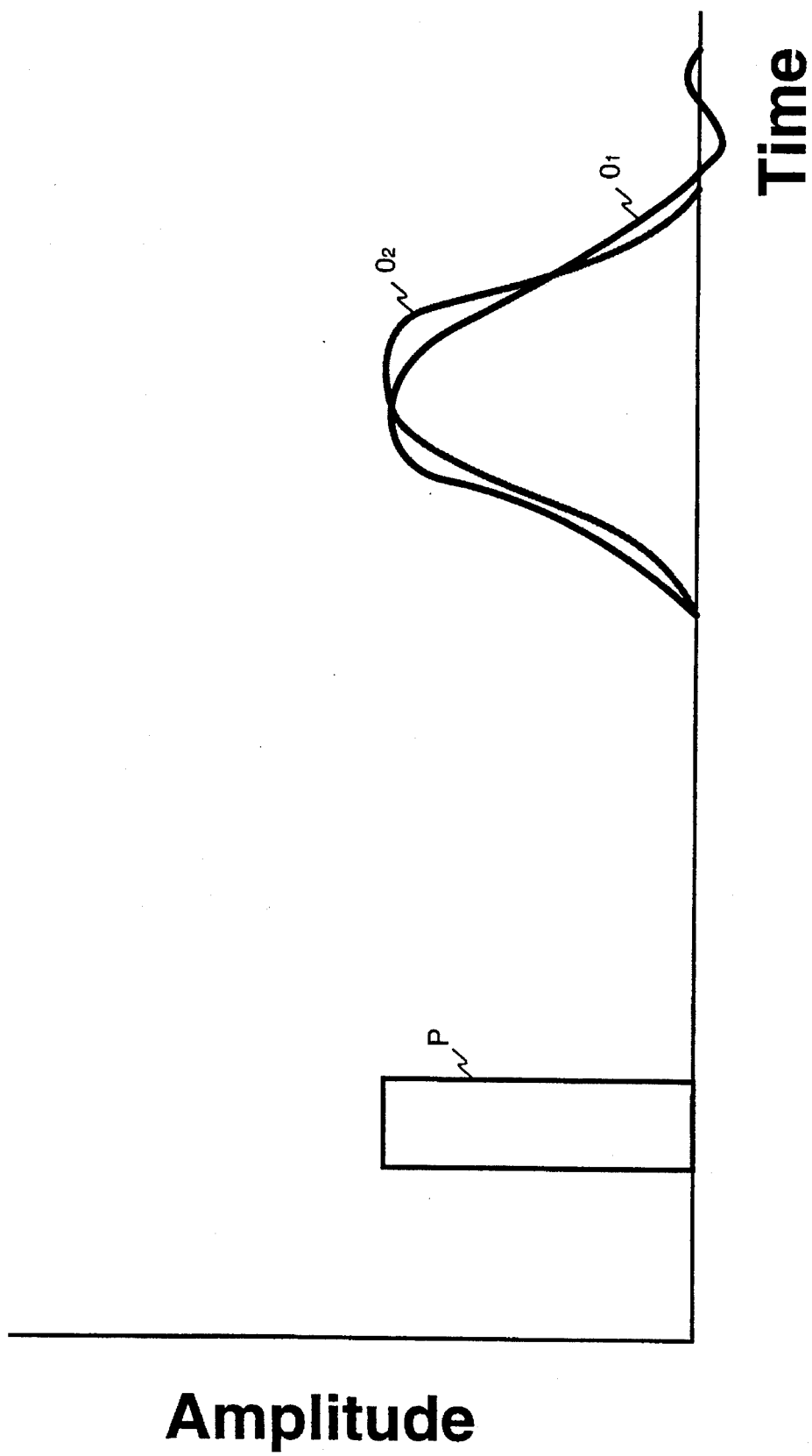

METHOD AND APPARATUS FOR DETECTING TRANSITIONS IN A TIME SAMPLED INPUT SIGNAL

FIELD OF THE INVENTION

The field of the present invention relates to signal processing and, more particularly, to a method and apparatus for determining the occurrence of transitions in a binary encoded input signal such as a scanned bar code label.

BACKGROUND OF THE INVENTION

Signals having transitions between binary levels are generated from many different devices. For example, optical scanners have been used to read encoded information on bar code labels and generate analog signals comprised of substantially binary levels. Bar codes typically consist of a series of parallel light and dark rectangular areas of varying widths. The light areas are often referred to as "spaces" and the dark areas as "bars". Different widths of bars and spaces are selected in order to define different characters of a bar code.

A bar code label is typically read by a scanner which detects reflected and/or refracted light from the bars and spaces comprising the characters. One common method of illuminating the bar code label is by use of a scanning laser beam, in which case the reflected light is detected by an optical detector. The detector generates an electrical signal having an amplitude determined by the intensity of the collected light. Another method for illuminating the bar code label is by use of a uniform light source with an array of optical detectors connected to an analog shift register (commonly called a charge-coupled device or CCD). In such a technique, as with a scanning laser, an electrical signal is generated having an amplitude determined by the intensity of the collected light. In either the scanning laser or CCD technique, the amplitude of the electrical signal has one level for dark bars and a second level for light spaces. The precise amplitudes of the two levels, however, are not known prior to scanning. As a label is scanned, positive-going transitions and negative-going transitions in the electrical signal occur, signifying transitions between bars and spaces. The transitions in the electrical signal are not perfectly sharp but may be gradual or noisy, thus making it difficult to determine the precise instant at which the transition has occurred. Inaccuracies in determining transition points may cause a bar code label to be misread.

Several techniques in signal processing have been developed for the purpose of determining transitions with greater accuracy. One such technique involves the detection of zero crossings of the second derivative of the input signal. The benefits of using a second derivative signal processing method for bar code readers are well known and are set forth, for example, in U.S. Pat. No. 4,000,397 entitled "Signal Processor Method and Apparatus" (issued Dec. 28, 1976).

Derivatives of the input signal in scanning systems are typically generated in an analog fashion by RC circuits. Differentiation circuits for obtaining analog derivatives of the input signal are well known by those skilled in the art and primarily comprise one or more operational amplifiers along with resistors and capacitors. Such differentiation circuits implement for the first derivative a transfer function having a zero at the origin and a single pole chosen beyond the highest frequency of interest. For the second derivative, such circuits implement a transfer function having two zeros at the origin and two poles chosen beyond the highest frequency of interest.

As the demand for accuracy and versatility in scanners continues to grow, conventional implementation methods of the second derivative technique may experience limitations. One such limitation is the ability to reject noise in the high frequency regions. As system performance is strongly affected by noise present in such regions, conventional implementations usually require the addition of a relatively complex low pass filter in the signal processing chain. Further, susceptibility to noise interference is affected by the fact that, while noise power tends to increase at higher frequencies, input signal power tends to roll off at such frequencies. The differentiation operation used in the conventional method to obtain the first or second derivative signals provides little or no attenuation outside the bandwidth of interest (i.e., the frequency band that contains most of the energy resulting from the light reflected from the symbol) and is therefore susceptible to high frequency noise.

A second limitation, related to the first, is that the conventional differentiator circuit does not exhibit flat group delay, or linear phase response, over the frequency band of interest. Group delay may be defined as the delay time of a circuit or system at various frequency values. A system exhibiting "flat" group delay has a relatively uniform delay time over the bandwidth of interest. Such a system is therefore said to have linear phase response. A system that does not exhibit flat group delay has relatively nonuniform or varying delay times dependent upon input signal frequency. Such a system is therefore said to have nonlinear phase response. Bar code scanner systems utilizing conventional differentiator circuits may, as a result of not having flat group delay, distort pulse shapes leading to errors in detecting pulse widths.

This type of distortion may be illustrated with reference to FIG. 1. FIG. 1 is a graph comparing the output $O_1$ of a low pass filter having nonconstant group delay compared to the output $O_2$ of an ideal filter having linear phase response or constant group delay in response to an input pulse P. The output $O_1$ of the filter with nonconstant group delay exhibits asymmetry and over/undershoot resulting from a nonlinear phase characteristic, possibly leading to incorrect or unsuccessful decoding of the symbol. To avoid distorting the shapes of pulses that occur in a bar code signal processing system, it is thus highly desirable that the entire system exhibit linear phase response or, equivalently, constant group delay.

Another related problem may occur while attempting to detect the zero crossings of the second derivative signal. Typically, the first derivative of the input signal is looked to in order to determine the time periods during which a valid zero crossing of the second derivative signal may occur. Zero crossings of the second derivative signal are considered valid if occurring during a portion of the first derivative signal peak. However, a common problem in conventional systems is that the first and second derivative signals are not properly aligned in time because of temperature and frequency dependent delays in the first and second differentiator circuitry. Significant misalignment of the first and second derivative signals may occur causing missed zero crossings or detection of false zero crossings of the second derivative signal.

Further problems have been created by increasing demand for greater depth of field in handheld scanners. Greater depth of field requirements result in a larger range of signal amplitudes leading to the potential for clipping of the input signals or derivative signals. Clipping typically occurs when a signal is limited by a positive or negative voltage supply level. Although enlarging the supply voltage may increase the dynamic range of operation and thereby minimize clipping, there is also a benefit in keeping power and voltage levels low to accommodate smaller, lighter and cheaper handheld scanners. Moreover, greater depth of field in scanners further accentuates the noise problems mentioned above as higher frequencies are generated as a result of using smaller labels and reading labels at longer distances. Reading labels at longer distances also reduces the strength of the input signal thus increasing the need to reduce the effects of noise.

SUMMARY OF THE INVENTION

The present invention provides a method and apparatus for detecting the transitions between binary levels of an input signal. The preferred method of the invention is based on approximating the derivative operation with the mathematical operation:

$$F(t) - F(t-D)$$

where F(t) is the electrical signal that represents the reflected light from the symbol, t is the time variable and D is a fixed time delay. The derivative of the signal is in effect approximated by the slope of a straight line between two points on the waveform separated by the delay time D.

In one embodiment the delayed version of the signal is obtained from a circuit element known as a delay line. A primary benefit of this technique is that delay lines, by definition, have constant group delay (and therefore linear phase) over the entire range of operation. The frequency response of the delay line differentiator is a periodic type response (often called a "comb" filter). The first null in the response is given by the formula f(min)=1/D where D is the delay time of the delay element and f(min) is in Hertz. If the delay time is chosen so that the frequency response has begun to decrease immediately beyond the frequencies of interest, the system has the advantageous property of reducing the amplitude of high frequency noise components while performing the differentiating function. In addition, as mentioned above, such filtering is done with completely linear phase.

The above concepts are further extended to obtain a second derivative signal using two delay elements. The signals entering the circuit, exiting the first delay element and exiting the second delay element are referred to as A, B and C respectively. The numerical approximation to the first derivative is the difference between two adjacent samples or A–B. Another approximate first derivative is calculated by B–C. An approximation of the second derivative is calculated from the difference between the two first derivatives, or:

$$(A-B)-(B-C)=A+C-2B$$

A summing amplifier may be used to perform the arithmetic operations to produce an approximation to the second derivative. The frequency response of this delay line second derivative circuit is also of a comb filter variety and has the advantageous property of reducing the amplitude of high frequency noise components while performing the differentiating function.

Once the second derivative signal is obtained in the above fashion, transitions between spaces and bars may be determined by locating the zero crossings of the second derivative signal in a manner such as that used in U.S. Pat. No. 4,000,397, incorporated herein by reference, or by various other techniques further explained herein. An important benefit of delay line differentiation is that, by virtue of the fixed delay intervals, the first and second derivatives are properly aligned in time such that the peak amplitude of the first derivative may be used to assist detection of the second derivative zero crossings. A further advantage of the above technique is the ability to maintain a suitable dynamic range of operation while minimizing sensitivity to clipping of signal amplitudes. Dynamic range is improved because the second derivative signal is derived independently from the first derivative signal; thus, clipping of the first derivative signal will not affect the precision of the second derivative signal.

An embodiment may also include an additional low pass filter in the system for attenuating any undesired high frequency noise beyond the bandwidth of interest. Such a filter need not have linear phase response beyond the bandwidth of interest and may therefore be a simple, well known filter type (such as a four-pole transitional Gaussian 12-dB) without degrading the shape of the signal pulses and providing, in combination with the delay line differentiator, superior overall system frequency response and group delay characteristics.

In another embodiment of the present invention the delay elements may be implemented as active all pass filters and therefore have the advantage of being easily adjusted to compensate for phase nonlinearities that arise in other parts of the system. In yet another embodiment, the delay periods may be adjustable so as to enable accurate scanning over a greater depth of field.

The foregoing and other objects, features, and advantages of the invention will become apparent from the following more detailed description set forth in conjunction with the accompanying drawings.

BRIEF DESCRIPTION OF THE DRAWINGS

FIG. 1 is a graph comparing the outputs of a linear phase and nonlinear phase low pass filter circuit when provided with a pulse input.

FIG. 2b is a graph of waveforms representative of the operation of the system of FIG. 2a.

FIGS. 3a–3f are detailed schematics of the system in FIG. 2a.

FIG. 9b is a waveform diagram illustrating the operation of the circuit shown in FIG. 9a.

FIG. 10 is a timing diagram for the embodiment of FIG. 9a.

FIGS. 13b–d are more detailed schematics of the alternative embodiment shown in FIG. 13a.

DETAILED DESCRIPTION OF THE PREFERRED EMBODIMENTS

Figure 2A:
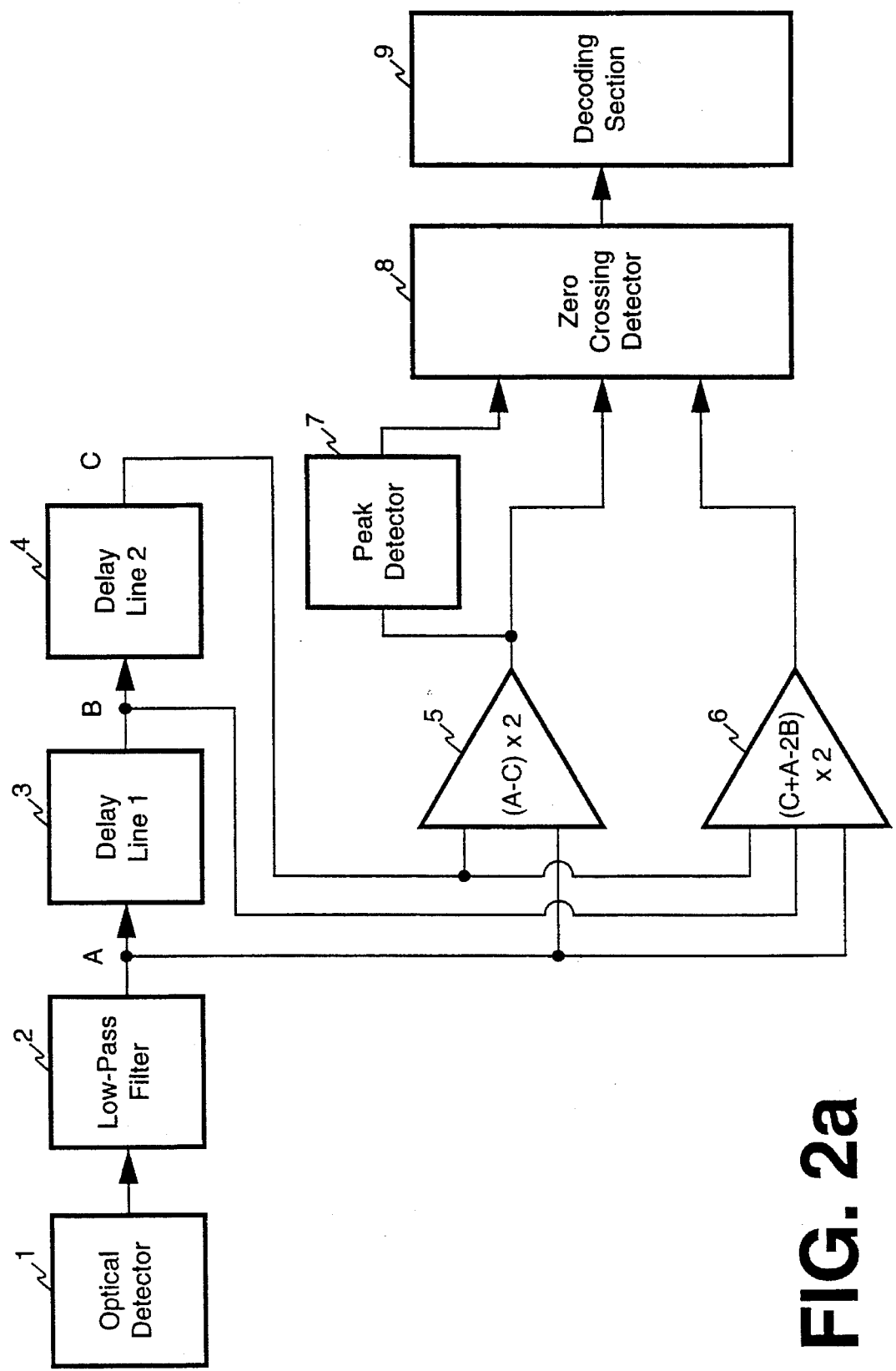
FIG. 2a is a system diagram of a preferred embodiment in accordance with the present invention.
Figure 2B:
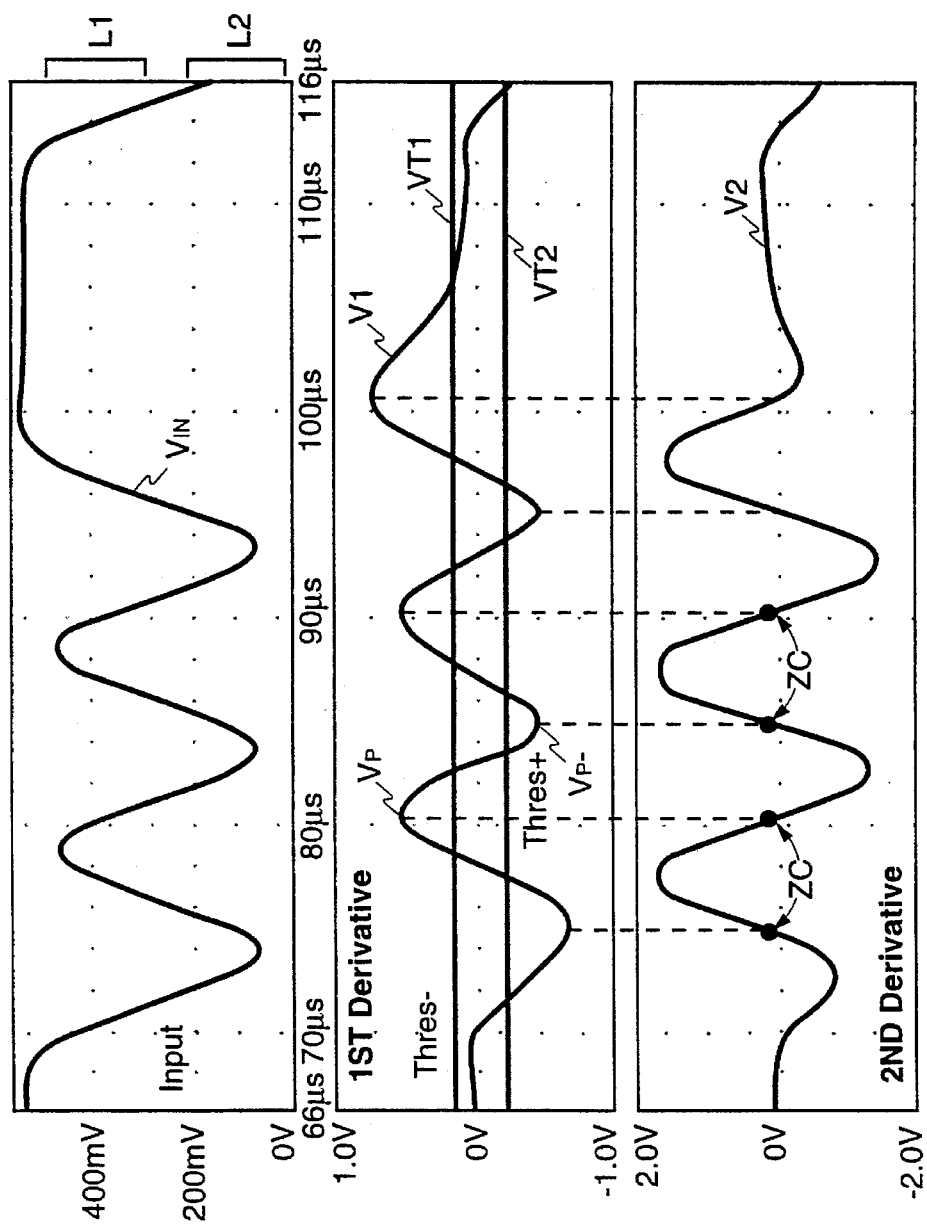

The preferred embodiments will now be described in reference to the drawings. FIG. 2a is a system diagram of a preferred signal processor. The operation of the system shown in FIG. 2a is explained in part with reference to the waveforms shown in FIG. 2b. When a bar code label (not shown) is read, an optical detector 1 detects light from the bars and spaces comprising the characters. The optical detector 1 generates an electrical input signal Vin having an amplitude determined by the intensity of reflected light incident upon the optical detector 1. The amplitude of the input signal Vin, as shown in FIG. 2b, generally has one level L1 for dark bars and a second level L2 for light spaces. The precise amplitudes of those levels L1 and L2 are typically unknown. The positive-going transitions and negative-going transitions of input signal Vin thus signify transitions between bars and spaces. The transitions in the input signal Vin are not perfectly sharp but may be gradual or have high frequency noise, thus making it difficult to determine the precise instant at which the transition has occurred.

The input signal Vin is sent from the optical detector 1 to a low-pass filter 2. The low-pass filter 2 is connected to a first delay element 3 which is in turn connected to a second delay element 4. The outputs of the low-pass filter 2 and the second delay element 4 are connected to a first summing circuit 5. The outputs of the low-pass filter 2 and both delay elements 3 and 4 are also connected to a second summing circuit 6. The summing blocks 5 and 6, as described in more detail herein, operate on those signals to produce an approximate first derivative signal V1 and an approximate second derivative signal V2, respectively, as shown on FIG. 2b. The first derivative signal V1 is sent to a peak detector 7. The output of the peak detector 7 and the approximate first and second derivative signals V1 and V2 are sent to a zero crossing detector 8 in order to determine zero crossings of the second derivative signal V2 in a manner described in more detail herein. The zero crossing detector 8 sends information to decoding logic 9 which decodes the bar code label.

Figure 3A:
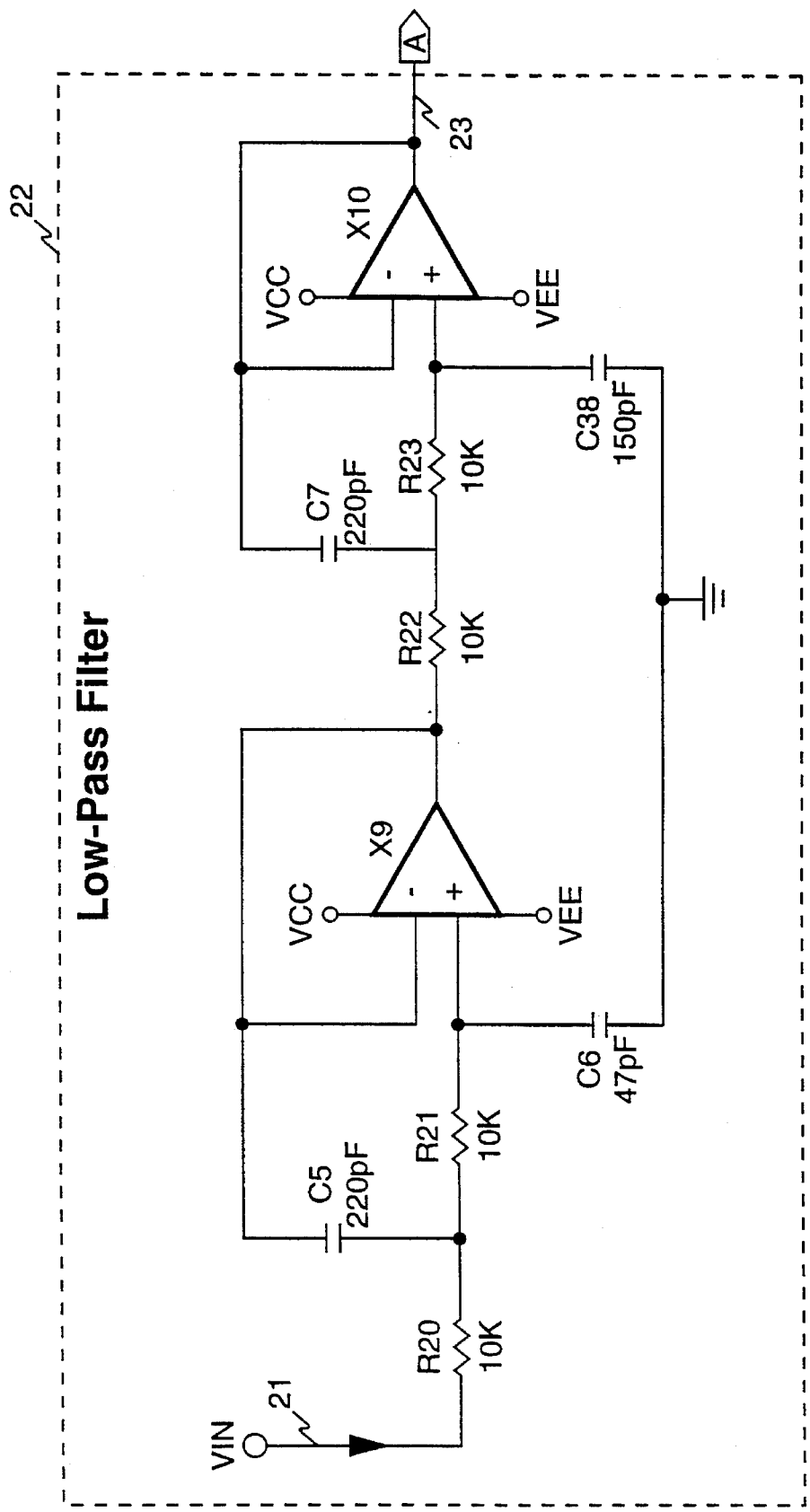
Figure 3B:
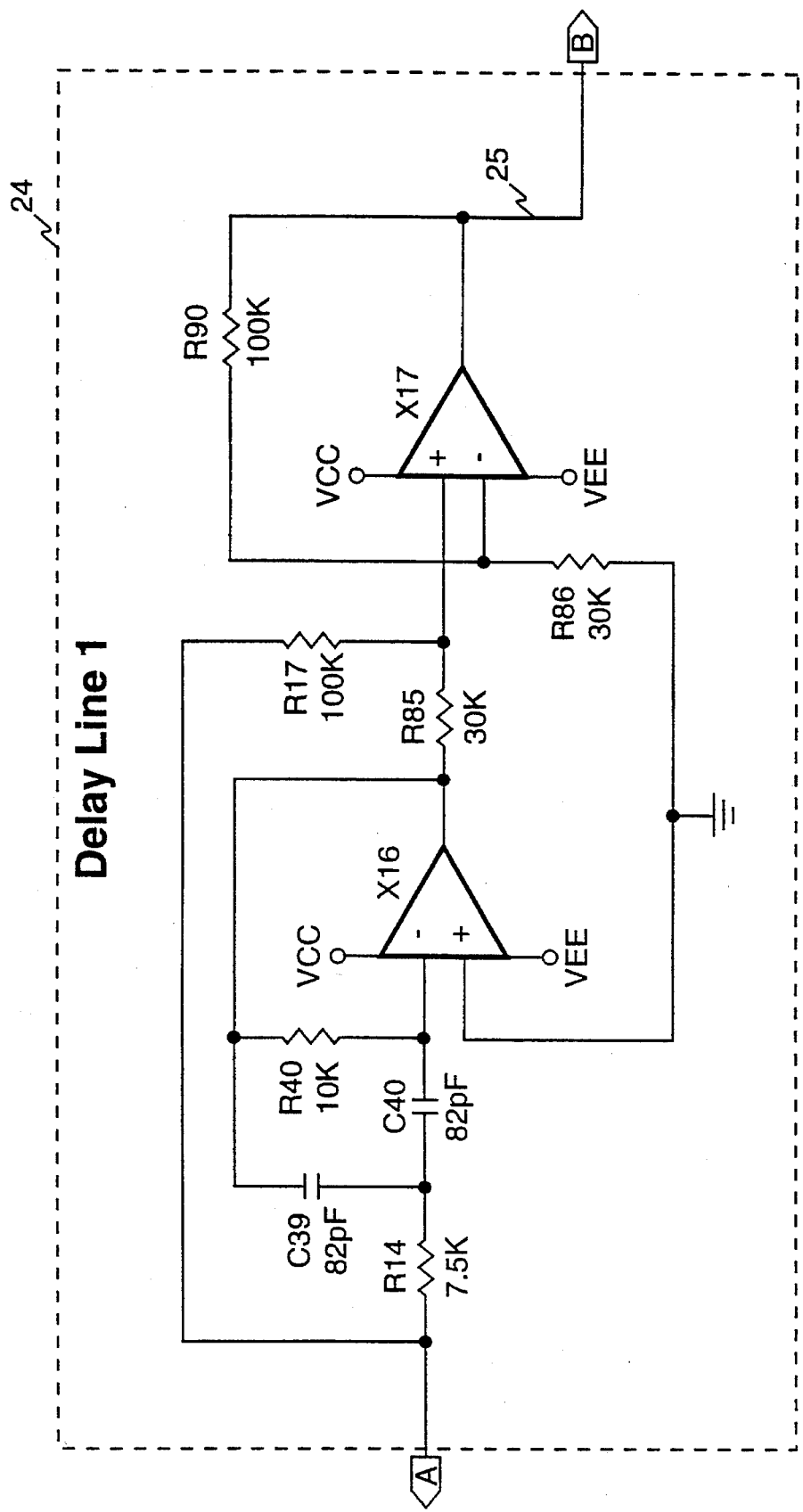
Figure 3C:
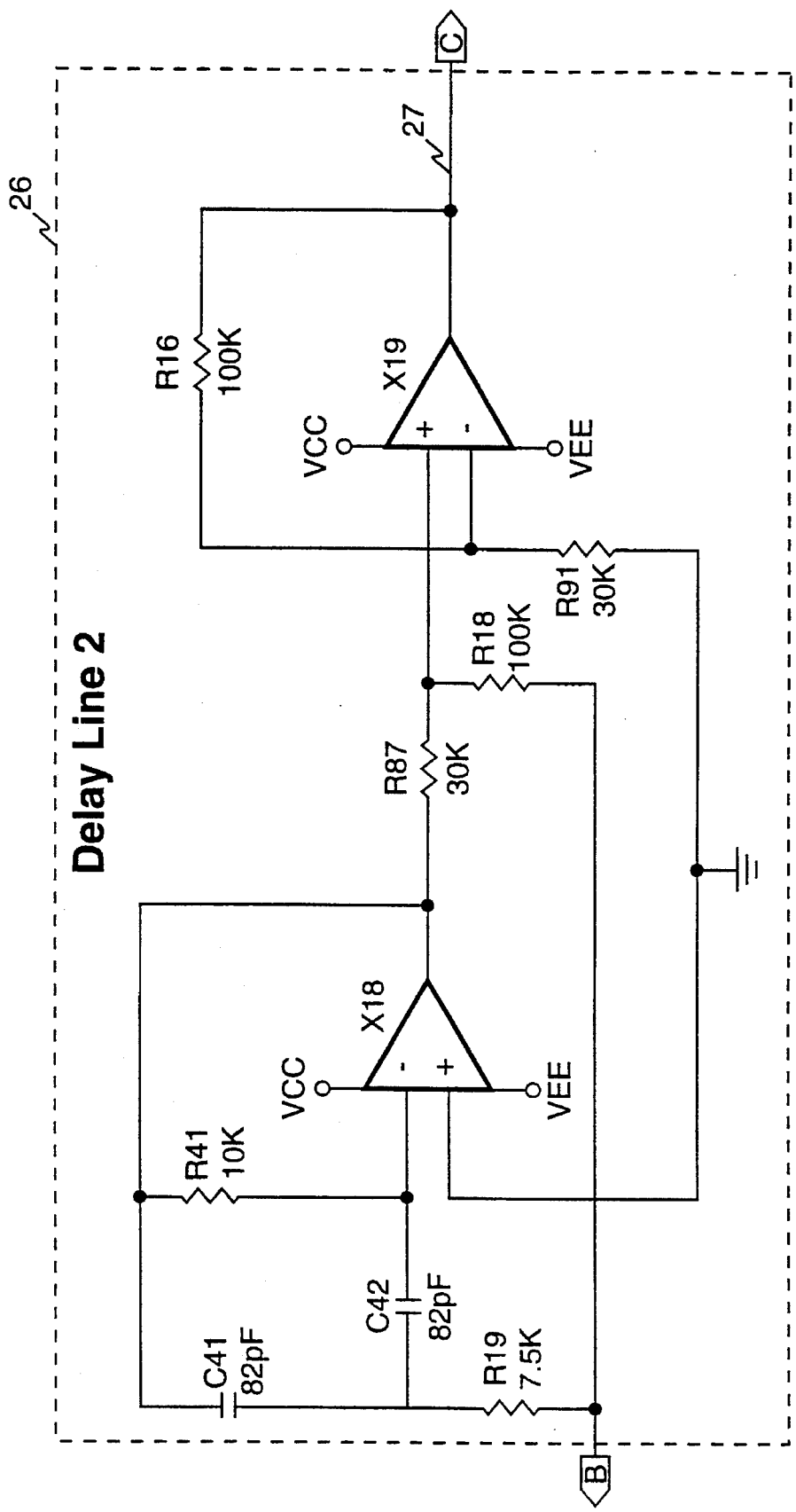
Figure 3D:
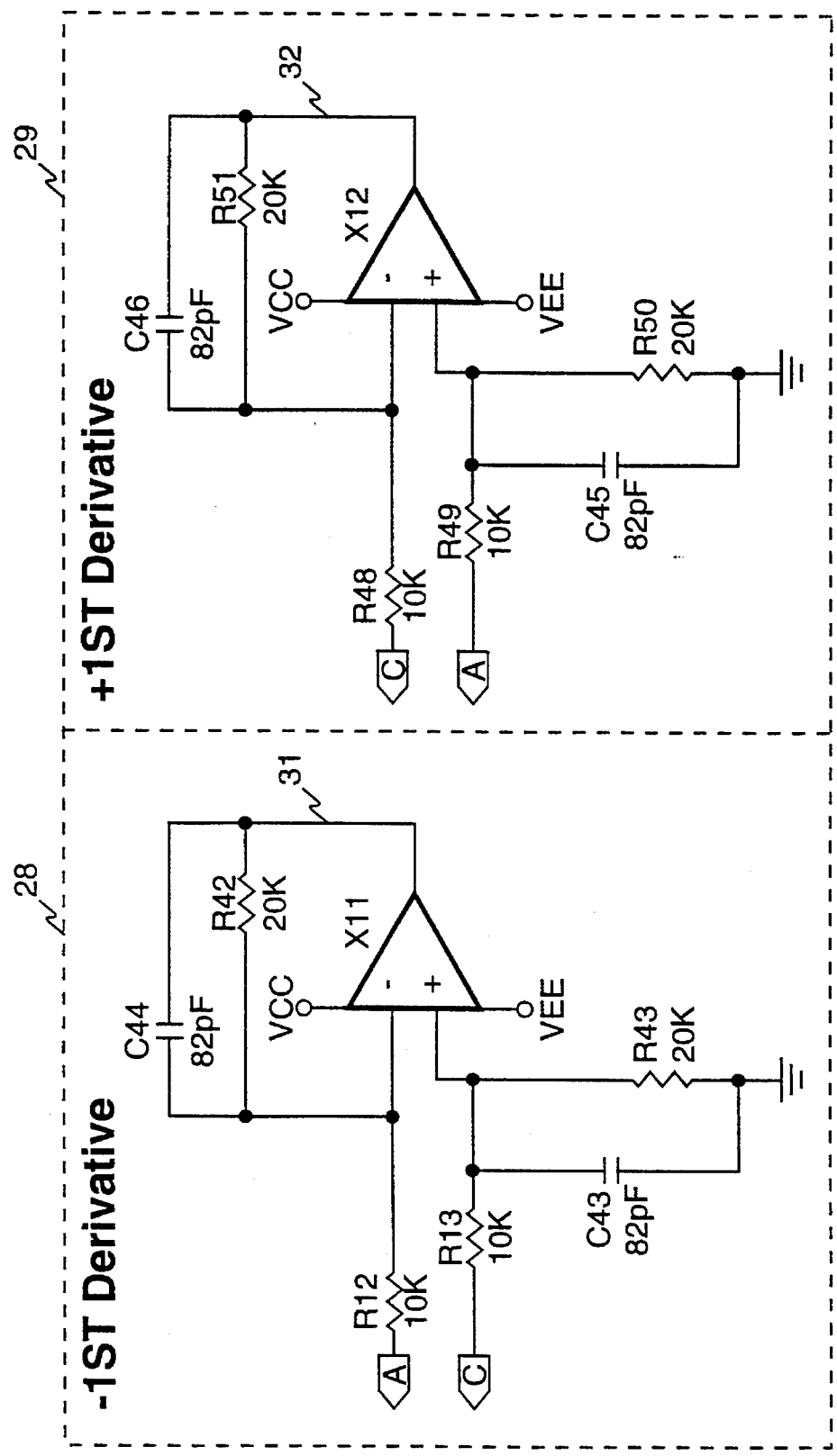
Figure 3E:
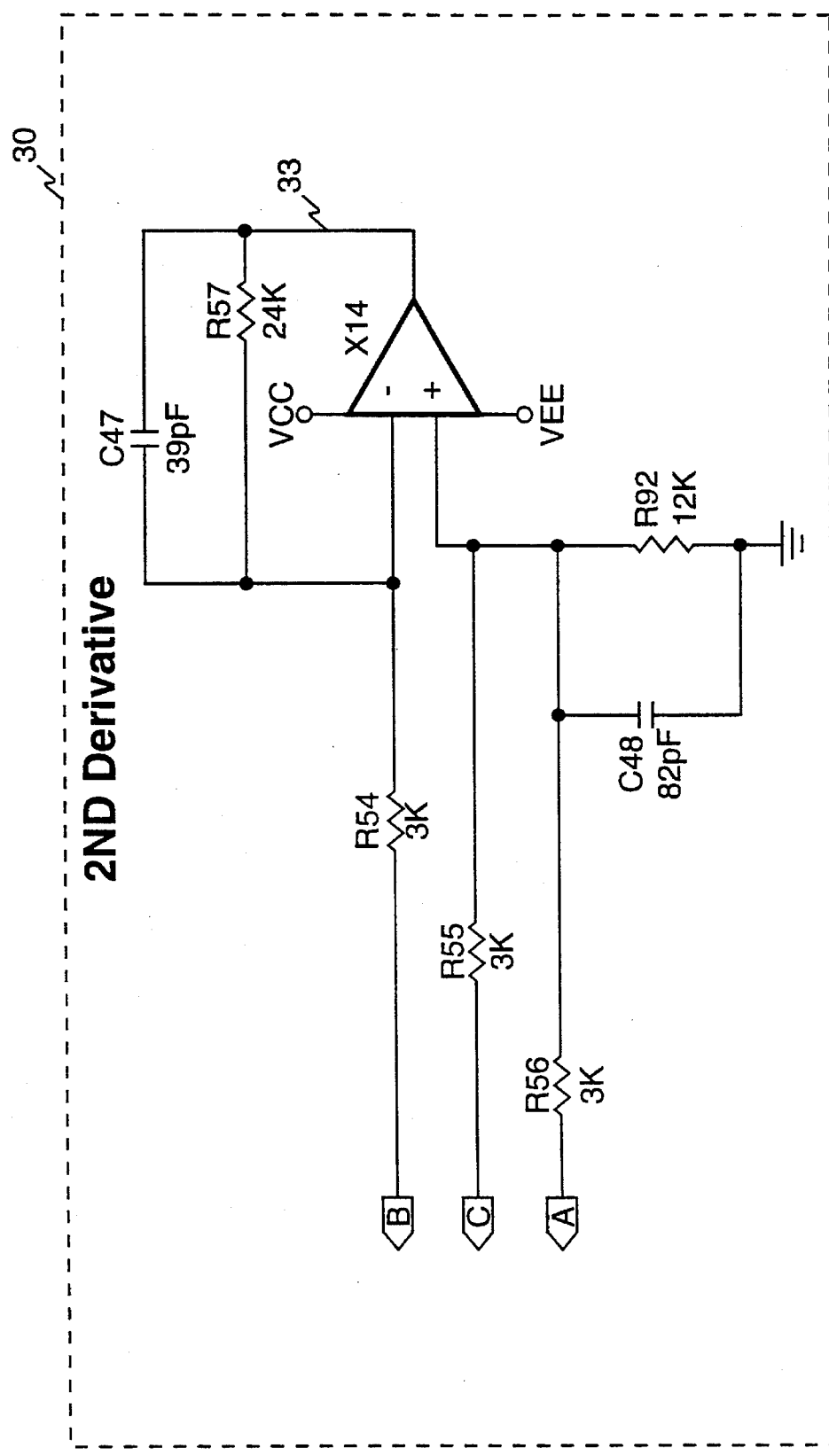
Figure 3F:
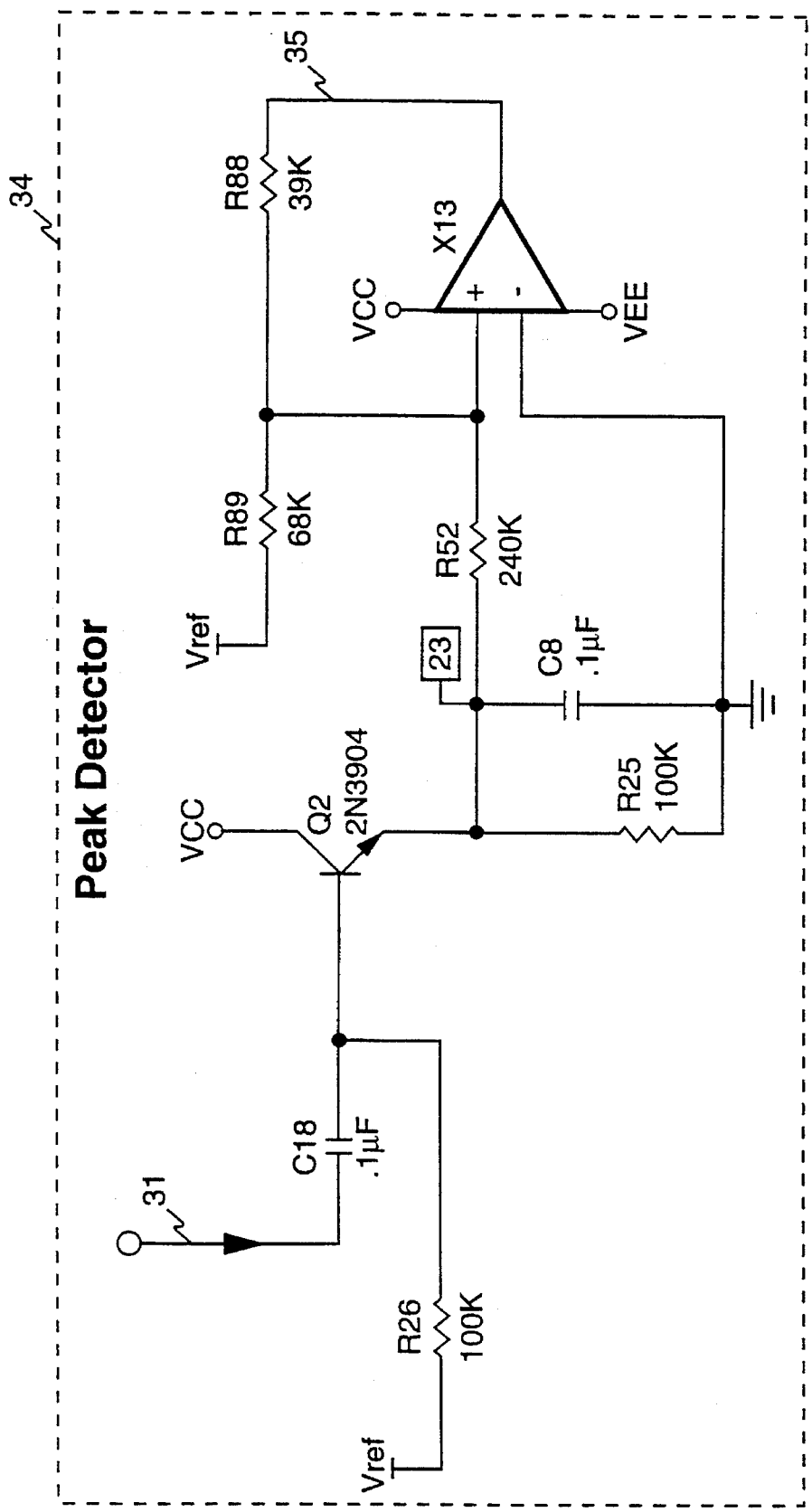

A more detailed embodiment is shown in FIGS. 3a–3f. Referring to FIG. 3a, the signal on input line 21 corresponds to Vin on FIG. 2a and is thus representative of an encoded analog signal such as may be generated by detecting reflected light from a bar code symbol that has been scanned by a moving laser beam. The frequency of the signal on input line 21 is generally a function of various factors including spot size, the angular velocity of the scanning beam, the distance of the label from the scanner, and the size of the label. In the case of a CCD scanner, the input frequency is proportional to the frequency of the clock driving the CCD device. The typical range of frequency varies from 1 kHz to 100 kHz.

The signal on input line 21 is connected to a low pass filter such as a four-pole transitional Gaussian 12-dB filter 22 having a breakpoint at approximately 85 kHz. Such a filter is of a relatively simple and well-known design (see, e.g., Arthur Williams, "Filter Design Handbook" (1981)) and exhibits fairly constant group delay over the low frequency bandwidth of interest, after which the frequency response drops off steeply and group delay is no longer constant. The four-pole transitional Gaussian 12-dB filter 22 is comprised of two similar stages involving operational amplifiers X9 and X10, which in one embodiment are model type TLC272 as manufactured by Texas Instruments. The output of the operational amplifier X10 provides a filtered input signal on line 23. The function of the filter 22 in conjunction with the rest of the system will be more fully explained later.

The filtered input signal on line 23 then enters a first delay element 24 which delays the signal on line 23 for an amount of time such as 2.75 microseconds. The first delayed signal on line 25 at the output of the first delay element 24 then enters a second delay element 26 which delays the first delayed signal on line 25 for another amount of time such as 2.75 microseconds. The output from second delay element 26 is a second delayed signal on line 27.

The delay elements 24 and 26 are preferably identical and may be implemented as passive or active RLC circuits or by techniques based on physical propagation time (e.g., transmission lines or surface acoustic wave devices). Active delay elements utilizing operational amplifiers are preferred because they are relatively cheap, are less sensitive to noise than inductors used in passive delay filters, and are suitable for the bandwidth of interest. The design procedure of active and passive electrical delay elements may be performed by one skilled in the art (see, e.g., Arthur Williams, "Filter Design Handbook" (1981)). As an example, the delay elements 24 and 26 may be implemented as two-pole all-pass filters of the 0.05 degree equi-ripple error family. In one embodiment, the operational amplifiers X16, X17, X18 and X19 are model type TLC274 as manufactured by Texas Instruments. As delay elements 24 and 26 are of identical design, they may be advantageously located on a single integrated chip so that operating conditions such as temperature will affect the delay time of both delay elements 24 and 26 equally.

Figure 3G:
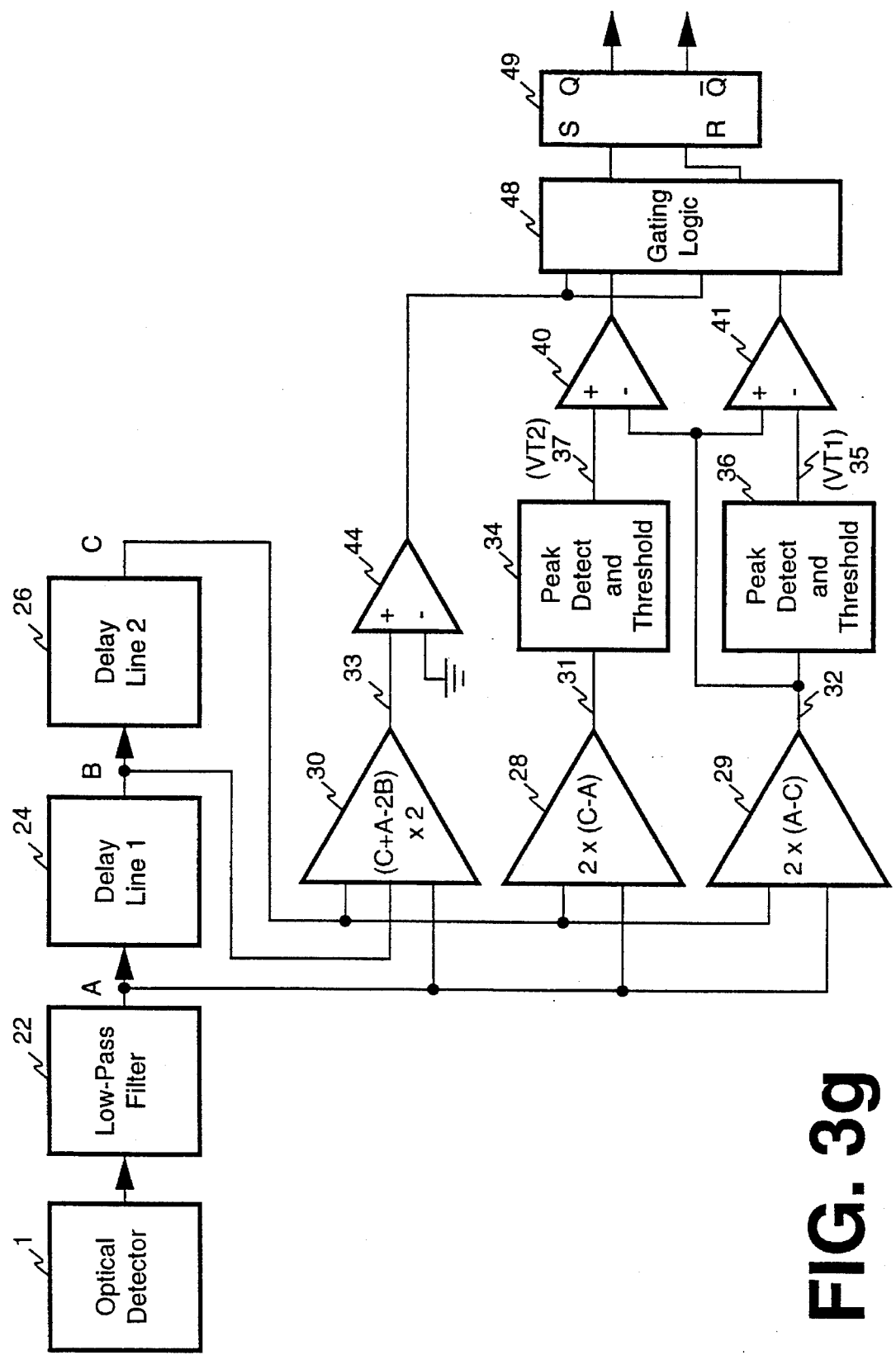
FIG. 3g is a system diagram of a preferred embodiment of the present invention incorporating the detailed circuits depicted in FIGS. 3a–3f.

It should be noted that the length of the delay periods of delay elements 24 and 26 need not be identical, and choosing different delay periods may reduce system overshoot. Overshoot may occur where delay elements 24 and 26 are implemented as active filters. When an active filter receives an impulse, ringing is experienced. Two consecutive active filters with identical characteristics may multiply the ringing, hence multiplying the overshoot. Selecting different delay periods may control overshoot by preventing unwanted ringing at the same frequencies to be combined. However, the delay periods are preferably selected as identical because of circuit economy considerations. FIG. 3g is a system diagram of an embodiment of the present invention showing the connections of the more detailed circuits depicted in FIGS. 3a–3f.

In operation, the delayed signals on lines 25 and 27 are used to obtain an approximation of a first and second derivative of the input signal Vin as further described below. As described earlier with reference to FIG. 2a, the signals entering the circuit, exiting the first delay element 24 and exiting the second delay element 26 are labeled A, B and C respectively and correspond in FIGS. 3a–3f to the filtered input signal on line 23, first delayed signal on line 25, and second delayed signal on line 27 respectively. The points labeled A, B and C also correspond to the points similarly labeled on FIG. 2a. A summing block 29 performs the operation A–C to obtain an approximation of a first derivative signal V1 of the input signal Vin. This operation is referred to herein as delay line differentiation. A second summing block 28 performs the inverse operation C–A to obtain a negative representation of the first derivative signal V1.

A third summing block extends similar principles to obtain an approximate second derivative signal V2. The numerical approximation of the first derivative is the difference between two adjacent samples or A–B. Another first derivative is calculated by B–C. The second derivative is calculated from the difference between the two first derivatives, or:

$$(A-B)-(B-C)=A+C-2B$$

Summing block 30 performs the above arithmetic operation. This operation is referred to herein as delay line double differentiation. Because the first and second derivatives are calculated across two delay periods, summing blocks 28 and 30 adjust the signal by a factor of two.

Obtaining the first and second derivative signals V1 and V2 in the above manner has several advantages over the conventional method. In conventional systems using analog differentiators, higher frequency response times differ from those at low frequency, making prediction of propagation times difficult. Because edge detection depends on the relative timing of zero crossings of the second derivative signal, nonuniform propagation delays over different frequencies may result in inaccuracies in determining zero crossings. Furthermore, conventional analog differentiation circuits exhibit little or no attenuation outside the bandwidth of interest.

Figure 4A:
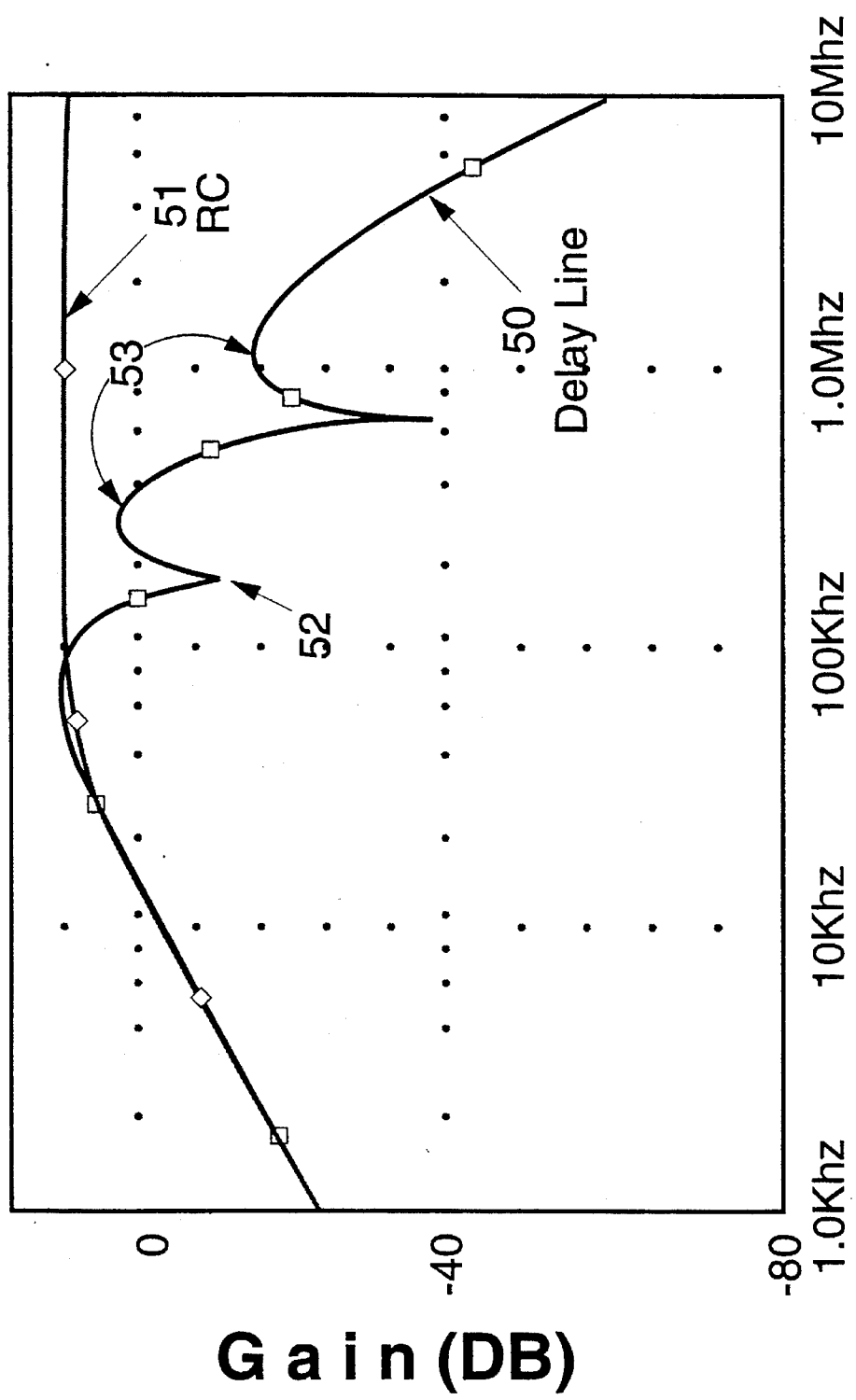
FIGS. 4a and 4b are graphs comparing the logarithmic and linear frequency responses, respectively, of a delay line differentiator with that of a conventional differentiator.
Figure 5A:
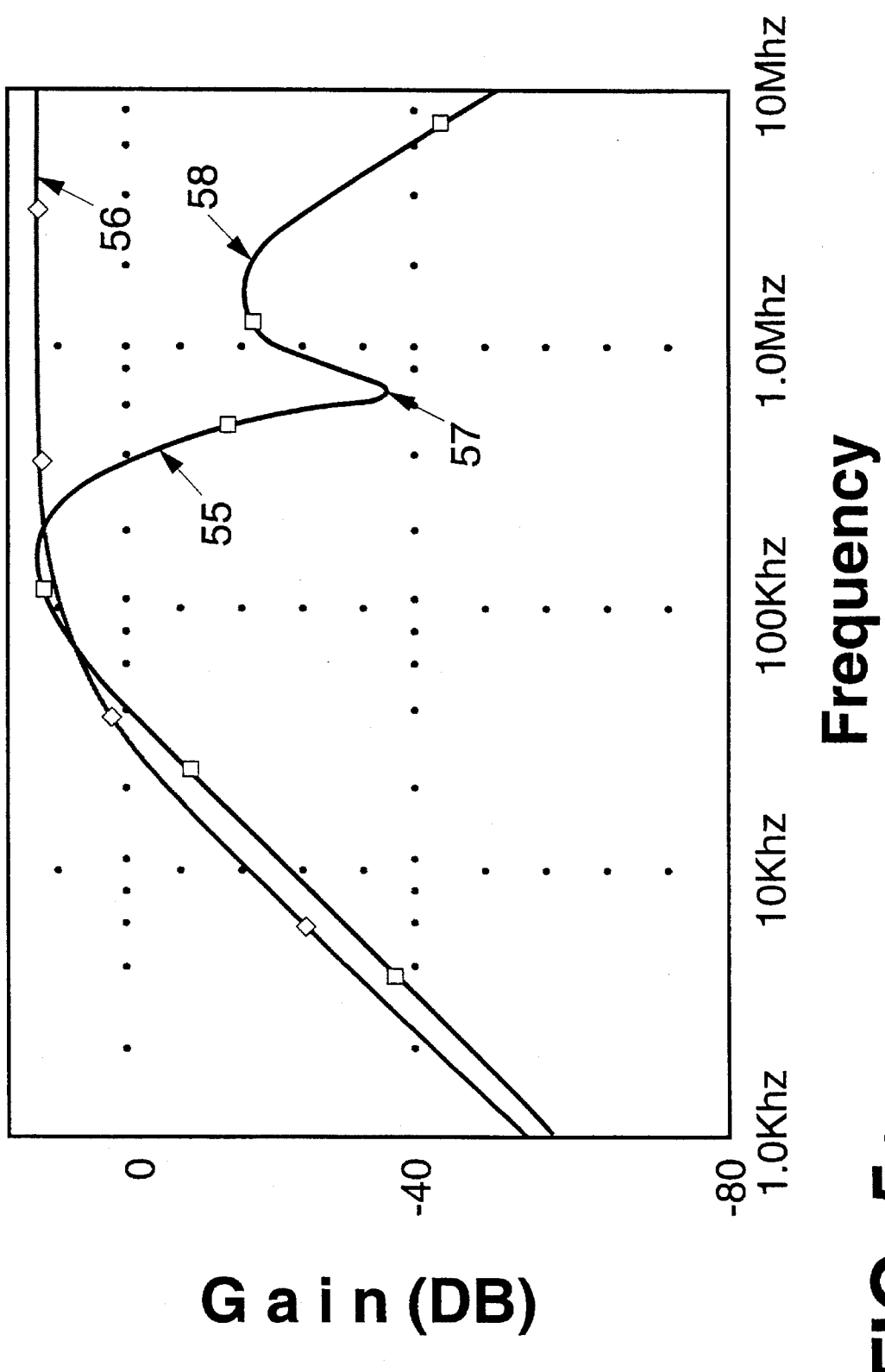
FIGS. 5a and 5b are graphs comparing the logarithmic and linear frequency responses, respectively, of a delay line double differentiator of the system in FIG. 2a that of a conventional second derivative circuit.

A device according to the preferred embodiment overcomes the above disadvantages by utilizing the advantageous filtering properties of delay line differentiation. FIG. 4a is a graph showing the periodic type frequency response 50 of a delay line differentiator corresponding to the first summing block 28 operating upon the filtered signal on line 23 and the second delayed signal on line 27. FIG. 5a is a graph showing the periodic type frequency response 55 of a delay line double differentiator corresponding to the second summing block 30 operating upon the filtered signal on line 23 and delayed signals 25 and 27.

Figure 4B:
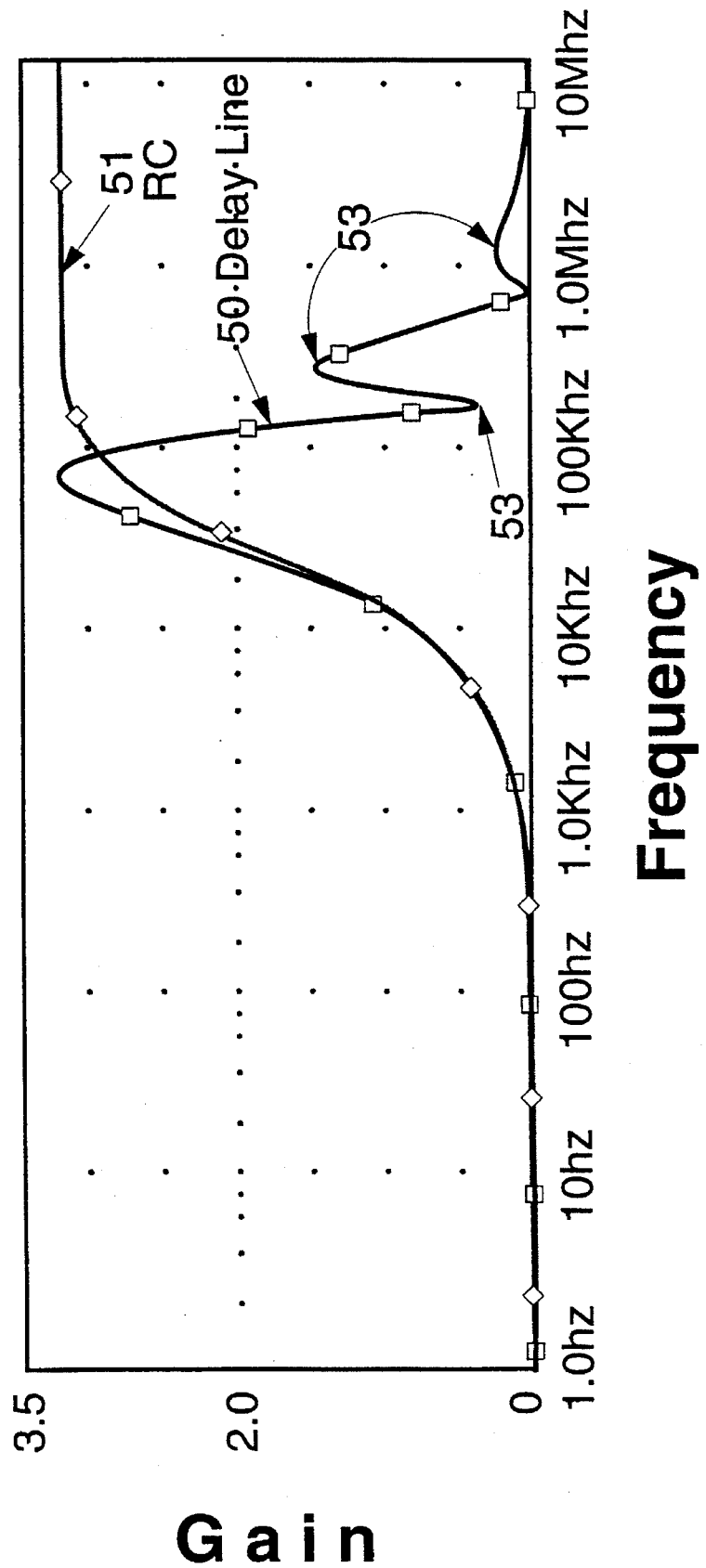

As shown in FIG. 4a, the frequency response 50 resulting from delay line differentiation is a periodic type response (often called a "comb" filter). The first null 52 of frequency response 50 is given by the formula f(min)=1/D, where D is the sum of the delay times of the two delay elements 24 and 26 and f(min) is in Hertz. If the sum of the delay times is chosen so that the frequency response 50 has begun to decrease immediately beyond the frequencies of interest, the system has the advantageous property of reducing the amplitude of high frequency noise components while performing the differentiating function. In addition, such filtering is done with completely linear phase. In the present embodiment, the sum of the delay times for delay elements 24 and 26 is 5.5 microseconds, placing the first null 52 at approximately 182 kHz. In comparison, the frequency response 51 of a conventional analog differentiator (not shown) has no similar attenuation at higher frequencies. The difference in high frequency attenuation is shown on a linear scale in FIG. 4b which emphasizes the advantageous frequency response characteristics of the preferred embodiment.

Figure 5B:
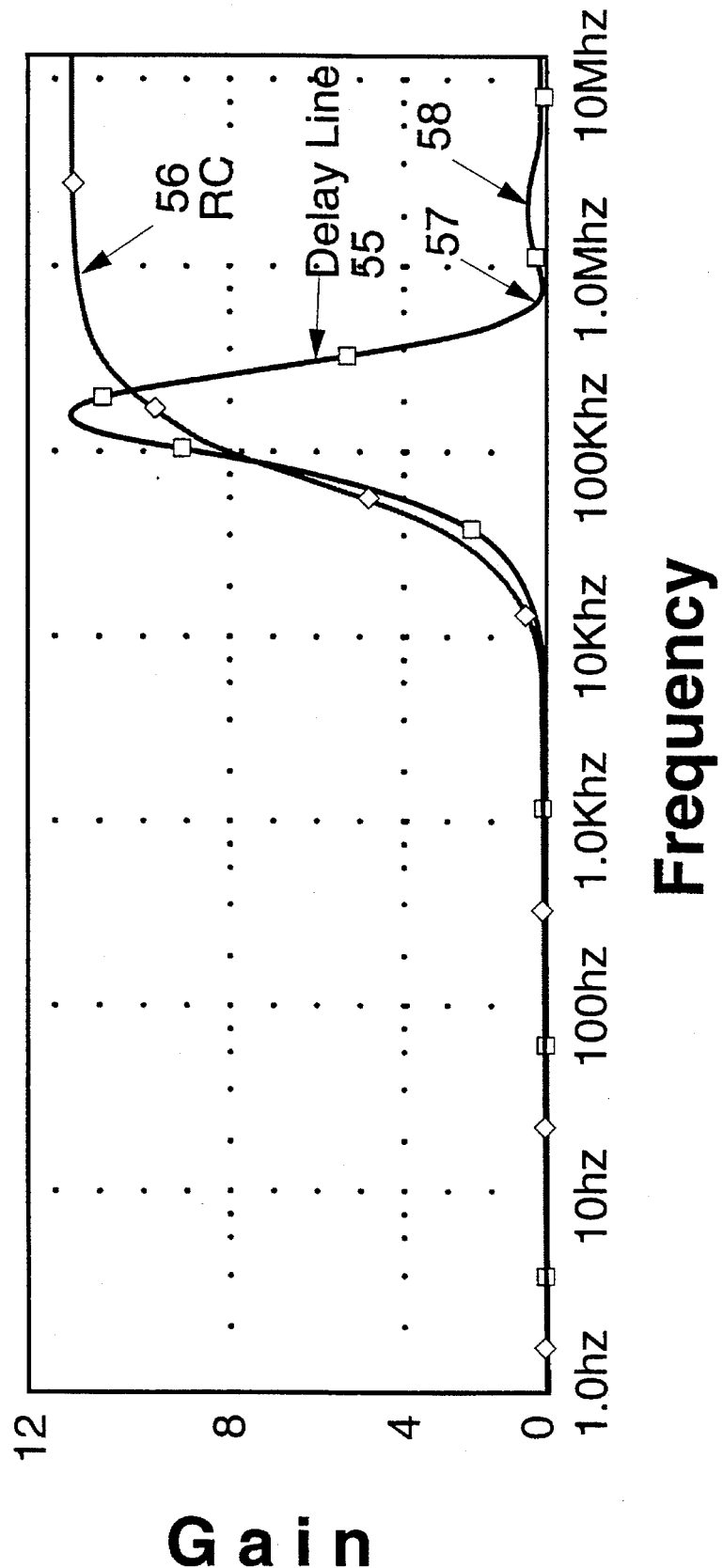

Similarly, as shown in FIG. 5a, the frequency response 55 resulting from delay line double differentiation is also of a comb filter variety and has the advantageous property of reducing the amplitude of high frequency noise components. This filtering is also done with linear phase. If the delay times for each of the delay elements 24 and 26 are 2.75 microseconds each, the first null 57 of the frequency response 55 will be placed at approximately 364 kHz, and the beginning of the roll off region at about 120 kHz, just past the band of interest. In comparison, the frequency response 56 of a conventional analog double differentiator has no similar attenuation at higher frequencies. The same plot in linear scale is shown in FIG. 5b, showing the advantageous frequency response characteristics of the preferred embodiment.

Figure 6A:
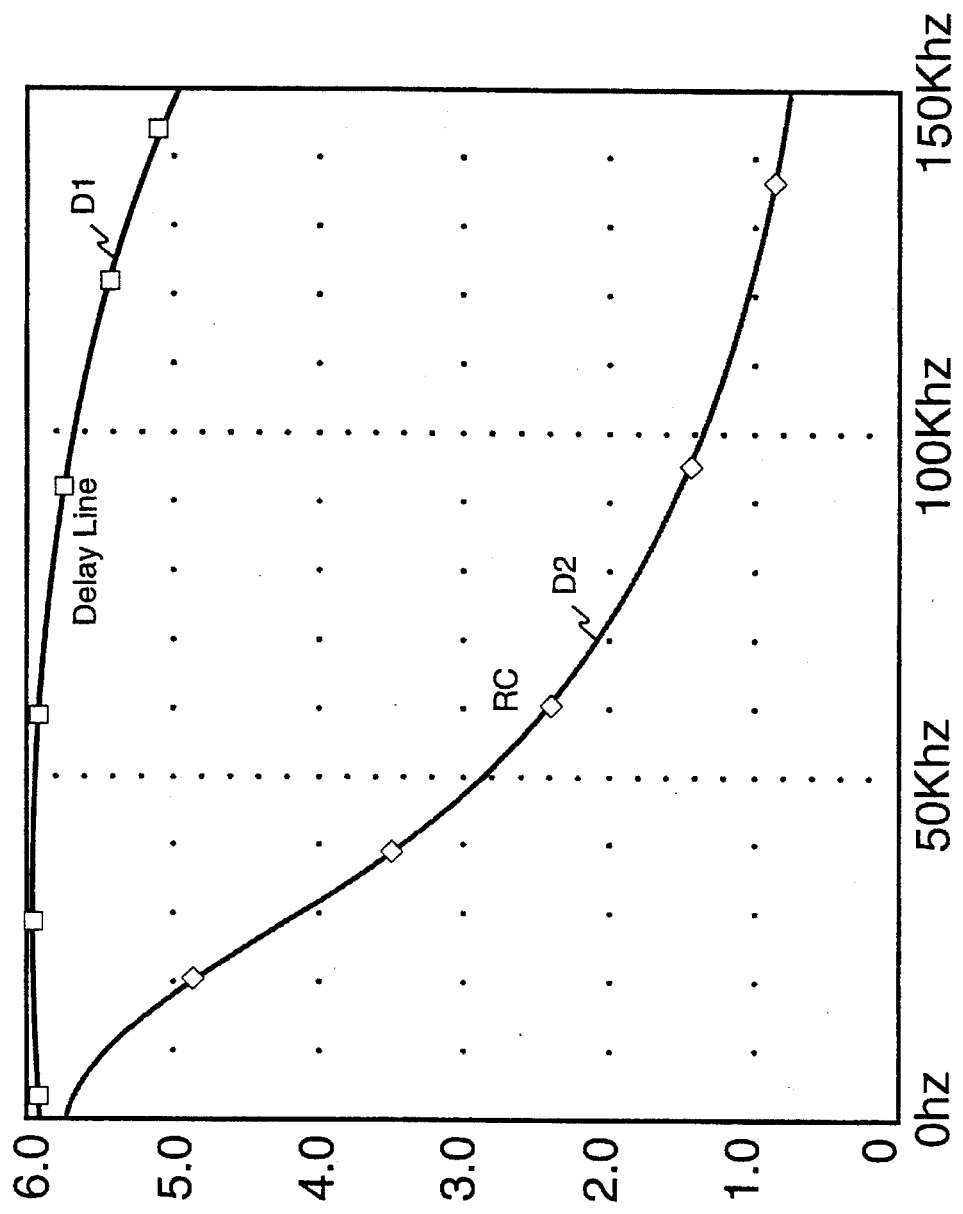
FIG. 6a is a graph comparing the delay time responses of a delay line differentiator with that of a conventional analog differentiator circuit.
Figure 6B:
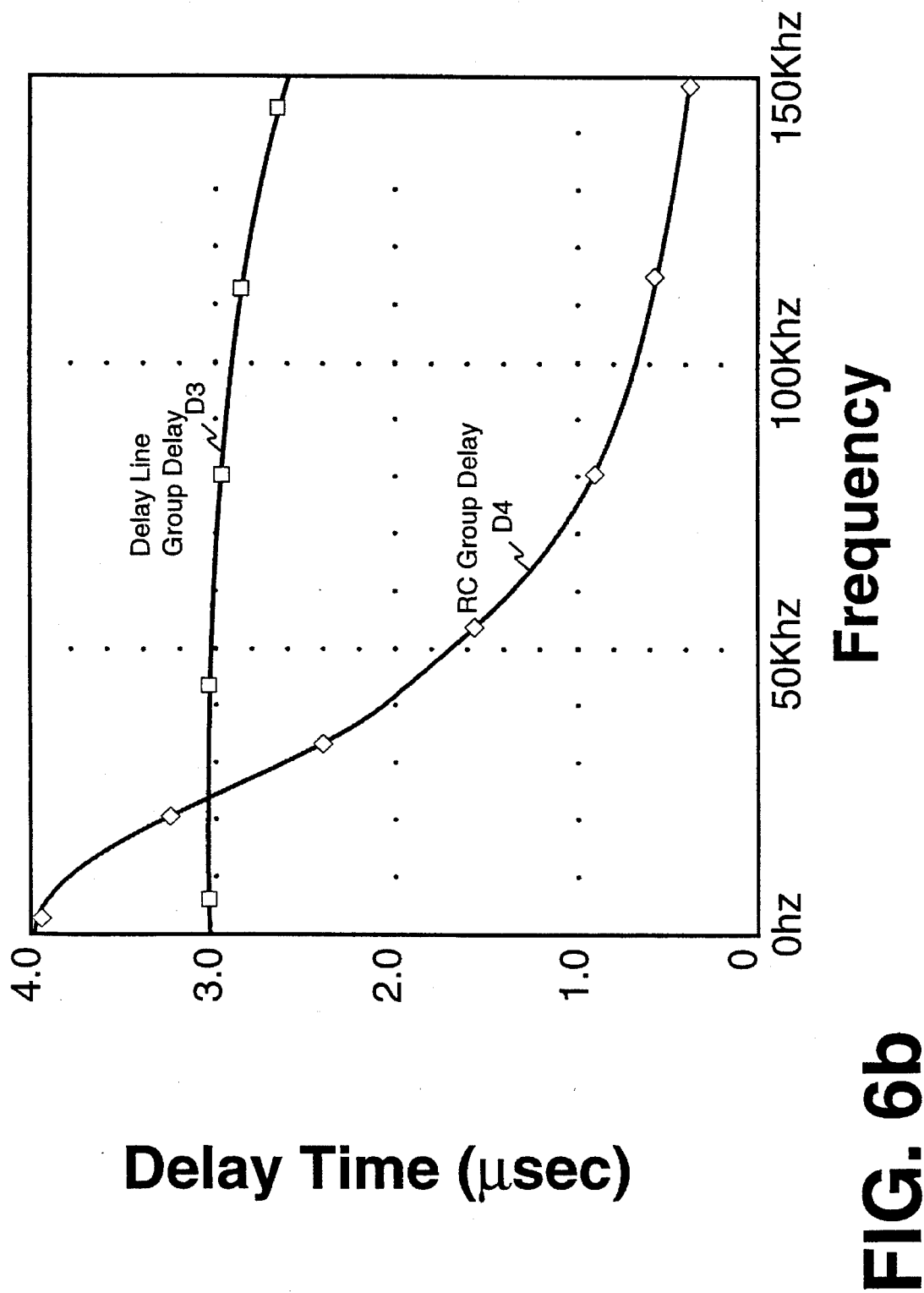
FIG. 6b is a graph comparing the delay time responses of a delay line double differentiator of the system in FIG. 2a with that of a conventional analog double differentiator circuit.

The roll off filtering properties of delay line differentiators are therefore advantageously used to suppress higher frequencies. Although many other types of filters exhibit a roll-off characteristic, virtually none which are used conventionally for the differentiation functions described herein do so with linear phase. Linear phase, as mentioned, provides the advantage of constant group delay and, consequently, minimal distortion due to the differentiation operation. In practice the group delay response of delay line differentiators tends to roll off at higher frequencies, as explained with reference to FIGS. 6a and 6b. The group delay D1 (in FIG. 6a) resulting from delay line differentiation and the group delay D3 (in FIG. 6b) resulting from delay line double differentiation are relatively constant but exhibit a slight roll off in delay response at approximately 80–85 kHz. In contrast, the group delay D2 (in FIG. 6a) of a conventional analog differentiator and the group delay D4 (in FIG. 6b) of a conventional analog double differentiator vary widely over the frequency band of interest. Preferably, a delay period is selected for delay elements 24 and 26 so that the amount of roll off is insignificant in the bandwidth of interest and will not reduce accuracy of detecting transitions (see, e.g., "Filter Design Handbook" cited above).

Figure 7:
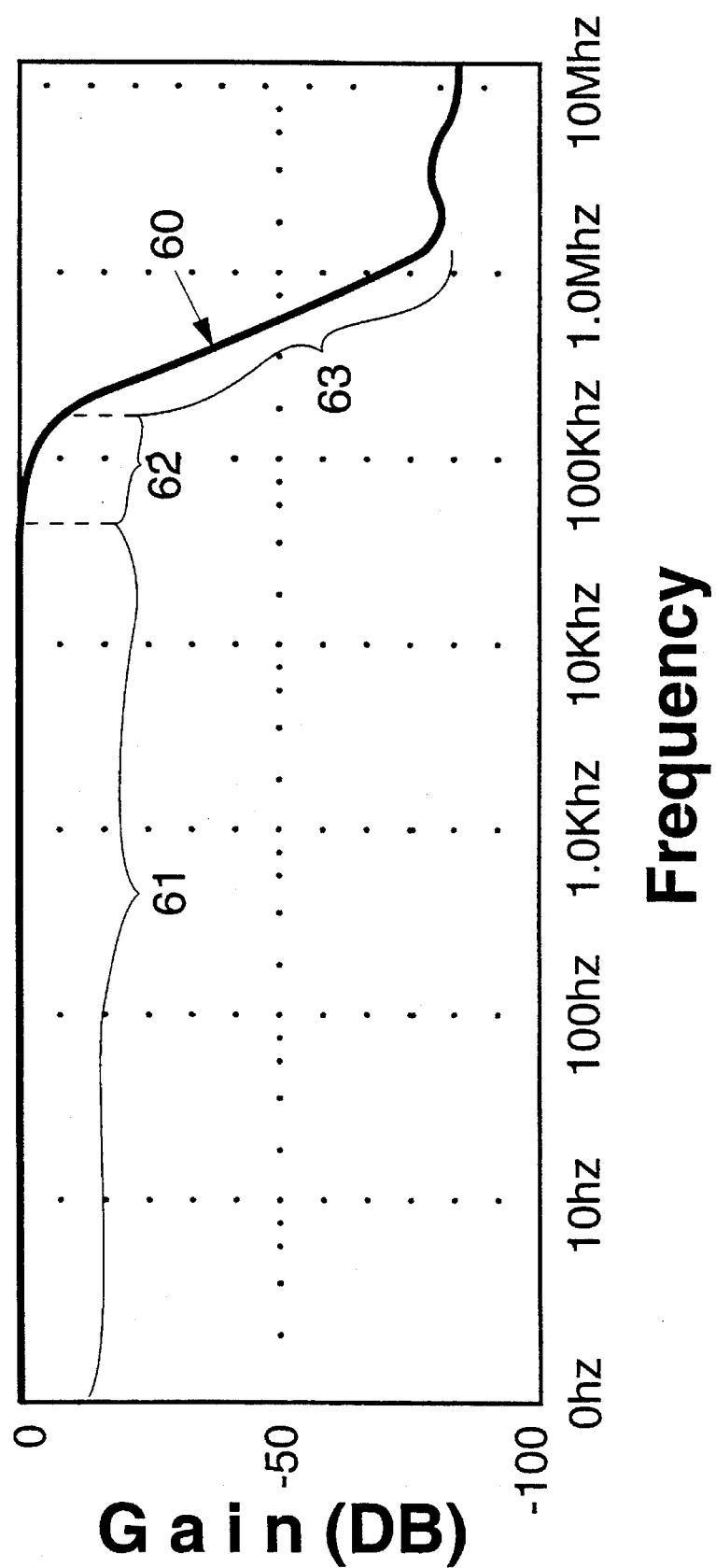
FIG. 7 is a graph showing the frequency response of a typical Gaussian 12-dB low pass filter.

Referring again to FIGS. 4a and 5a, it can be seen that side lobes 53 and 58 are present in the respective frequency responses 50 and 55. The side lobes 53 and 58 are regions in which less attenuation of high frequency noise occurs. In order to reduce the size of the side lobes 53 and 58 and further increase noise attenuation at high frequencies, the four-pole transitional Gaussian 12-dB filter 22 is placed as a prefilter between the input signal Vin on line 21 and the first delay element 24 and works in combination with the comb filtering effects described above in order to achieve desirable overall system frequency response. Referring to FIG. 7, the frequency response 60 of the four-pole transitional Gaussian 12-dB filter 22 is shown. The frequency response 60 exhibits flat group delay throughout the unitary gain portion 61 and relatively flat group delay in the roll off region 62. Beyond that point, once the frequency response 60 drops off sharply, group delay is not constant. However, constant group delay is not important at those frequencies because they are beyond the operating range. Thus, the sharp drop-off 63 of the frequency response 60 effectively suppresses the side lobes 53 and 58 as shown on FIGS. 4a and 5a without degrading system performance or affecting group delay within the range of desired operating frequencies.

Figure 8A:
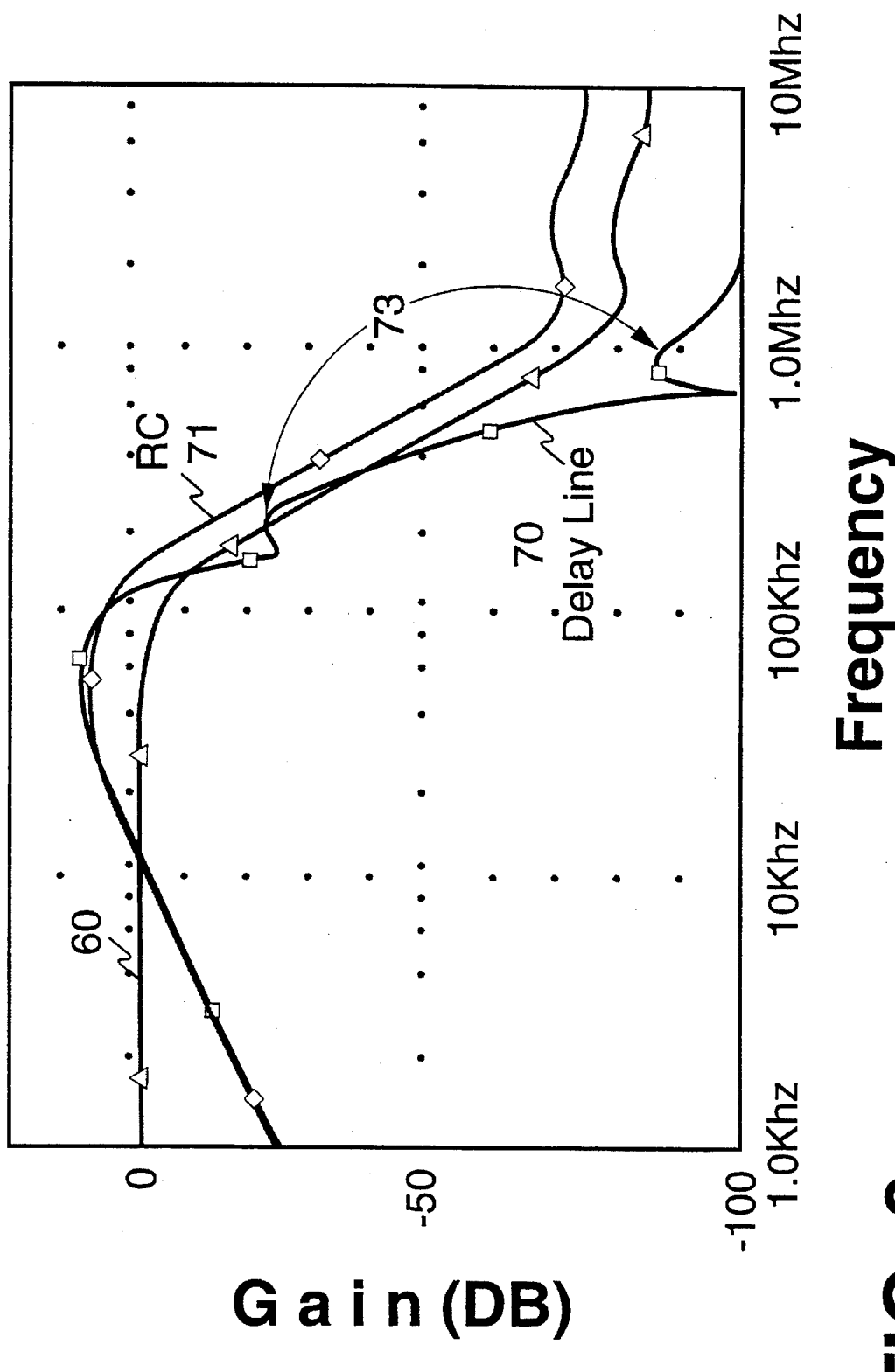
FIG. 8a is a graph comparing the frequency response of a delay line differentiator according to the present invention with a conventional analog differentiator circuit after addition of the low pass filter stage of FIG. 7.

The effect of the addition of the four-pole transitional Gaussian 12-dB filter 22 is further explained with reference to FIGS. 8a and 8b. As shown in FIG. 8a, the frequency response 70 is the combination of frequency response 60 of the four-pole transitional Gaussian 12-dB filter 22 and the frequency response 50 as shown on FIG. 4a. Notably, the side lobes 53 are substantially suppressed and are reduced to much smaller side lobes 73. In comparison, it can be seen that the frequency response 71 resulting from the combination of the same four-pole transitional Gaussian 12-dB filter 22 and the frequency response 51 as shown in FIG. 4a with respect to an analog differentiator has significantly less attenuation at higher frequencies.

Figure 8B:
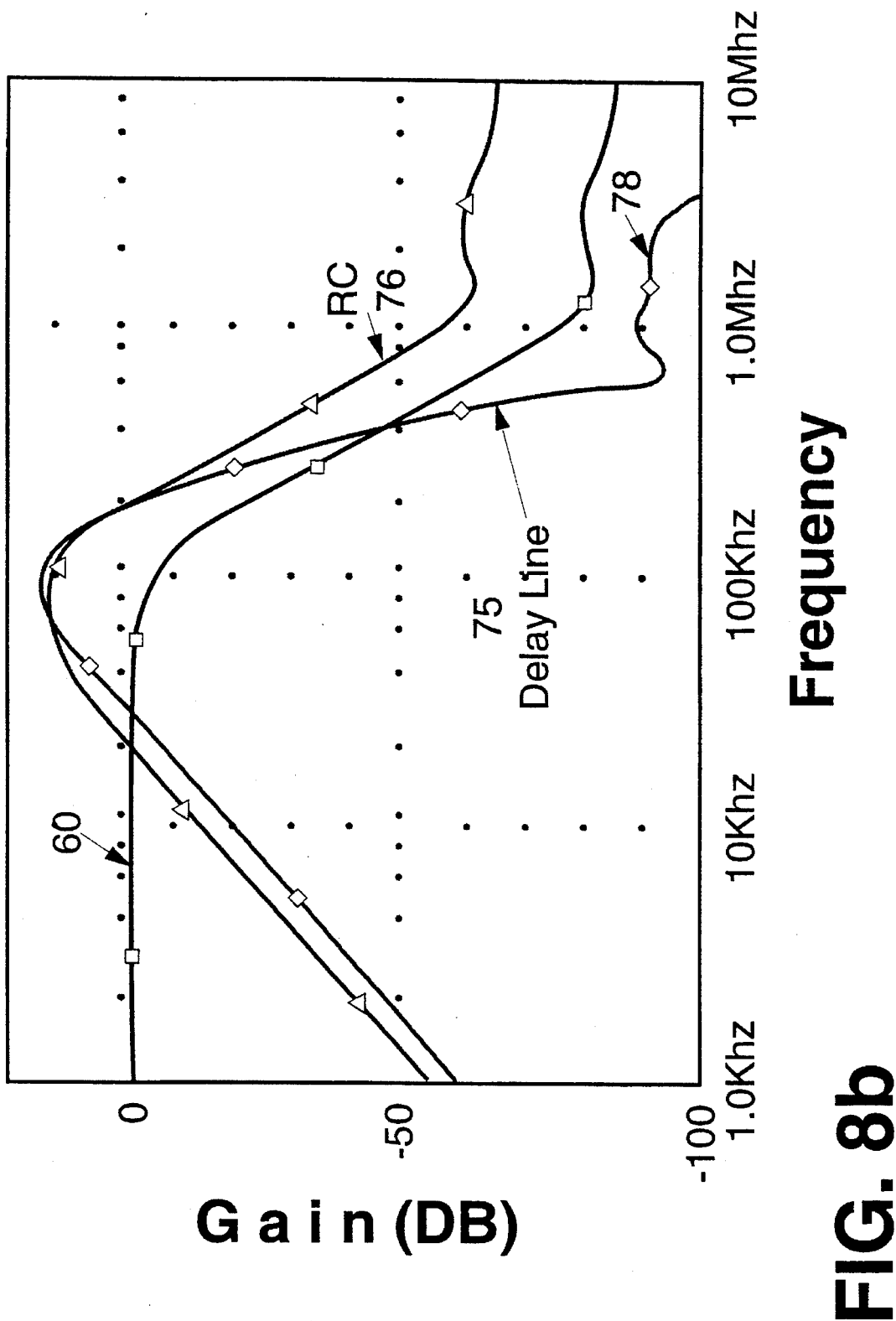
FIG. 8b is a graph comparing the frequency response of a delay line double differentiator of the system in FIG. 2a with a conventional analog double differentiator circuit after addition of the low pass filter stage of FIG. 7.

Similarly, the graph of FIG. 8b illustrates the benefit to delay line double differentiation resulting from the addition of the four-pole transitional Gaussian 12-dB filter 22 to the signal processing chain. By virtue of adding the filter 22, the side lobe 58 of the frequency response 55 shown in FIG. 5a is substantially reduced to a much smaller side lobe 78. Furthermore, the frequency response 75 is much steeper than the frequency response 55 prior to addition of the filter 22. In comparison, the frequency response 76 of an analog double differentiator in combination with the same four-pole transitional Gaussian 12-dB filter 22 has significantly less attenuation at higher frequencies.

It will now be explained in more detail the operation of the circuits that calculate the approximate derivative signals. Operational amplifiers X11, X12 and X14 are used to perform the adding and subtracting functions mentioned earlier. More specifically, the second delayed signal on line 27 and filtered input signal on line 23 are provided as inputs to an operational amplifier X12 which performs the function of subtracting filtered input signal on line 23 from second delayed signal on line 273 in order to provide an approximate negative first derivative signal on line 32. In other words, the operational amplifier X11 performs the operation C–A mentioned above. Likewise, the second delayed signal on line 27 is subtracted from the filtered input signal on line 23 by a summing amplifier X12 in order to obtain an approximate positive first derivative signal on line 31. In other words, the summing amplifier X12 performs the operation A–C. The capacitors C43 and C45 and resistors R43 and R50 connected to the inputs of summing amplifiers X11 and X12 perform additional single-pole low pass filtering to further reduce noise leakage into the following processing stages by suppressing the side lobes 53 shown on FIG. 4a. Such filtering is not done with constant group delay past the critical band of interest. The reason two summing blocks 28 and 29 are used to derive independently the negative and positive derivative signals on lines 31 and 32 is to maintain proper alignment of both the negative and positive derivative signals on lines 31 and 32 with the second derivative signal V2.

An approximation of the second derivative of the input signal Vin is obtained in a similar fashion by another operational amplifier X14. The operational amplifier X14 adds the filtered input signal on line 23 to the second delayed signal on line 27 and subtracts twice the first delayed signal on line 25 to arrive at the approximate second derivative signal V2. In other words, operation amplifier X14 performs the A+C–2B function mentioned earlier. A capacitor C48 and a resistor R32 act as a single-pole low pass filter connected to the input of operational amplifier X14 in order to provide additional suppression of the side lobe 58 shown on FIG. 5.

In one embodiment, the operational amplifiers X11, X12 and X14 are model type TLC272 manufactured by Texas Instruments.

After the generation of the approximate first and second derivative signals V1 and V2, the system detects zero crossings of the second derivative signal V2 in order to determine accurately the transitions of the input signal Vin. Zero crossings may be determined in a manner similar to that described, for example, in U.S. Pat. No. 4,000,397. As shown in FIG. 2a, a peak detector 7 receives the first derivative signal V1 and detects its peak value Vp as shown on FIG. 2b. The peak value Vp is sent to a zero crossing detector 9 that uses a percentage of the peak value Vp to establish a threshold VT1. The zero crossing detector 9 sends zero crossing information to a decoder section 8 for decoding of the bar code label.

More specifically, as shown in FIG. 3g, the zero crossings of the second derivative signal V2 may be detected by comparator 44 during intervals when the negative or positive first derivative signal 31 or 32 exceed the respective thresholds VT1 and VT2 as determined by gating logic 48. As this method is more fully described in the '397 patent, only certain aspects of this embodiment will be noted. The thresholds VT1 and VT2 may be derived from the negative or positive first derivative signal on lines 31 or 32, or both, or the second derivative signal on line 33. Preferably the threshold signals VT1 and VT2 are set independently of one another as shown in FIG. 3g. It is desirable to set the threshold signals VT1 and VT2 above the noise floor yet low enough to detect smaller amplitude humps. The threshold signals VT1 and VT2 may therefore be set to a percentage, such as 30%, of the peak voltage Vp of the first derivative signal V1. The derivation of the negative threshold signal VT2 will be described in detail, with the derivation of the positive threshold signal VT1 being accomplished in a like manner. The threshold signal VT2 is maintained above the noise floor by a DC offset of 100 mV provided by the voltage reference Vref through a resistor R89. The peak value Vp of the negative first derivative signal on line 31 is obtained by charging a capacitor C8 when the signal on line 31 is rising and allowing the charge on the capacitor C8 to decay slowly thereafter through resistor R25. More specifically, the negative first derivative signal on line 31 is connected to a capacitor C18 which connects to the base of a transistor Q2. Transistor Q2 is biased around an operating point of approximately 0.6 volts. The collector of transistor Q2 is connected to system voltage Vcc. The emitter of transistor Q2 is connected to the charging capacitor C8 and a decay resistor R25. The emitter of Q2 is also connected to an operational amplifier X13 through resistor R52. The operational amplifier X13 adds the 100 mV offset to 0.3 times the peak voltage Vp (0.3×Vp) to produce the threshold signal VT2. The operational amplifier X13 may be a model type TLC272 as manufactured by Texas Instruments.

Figure 2C:
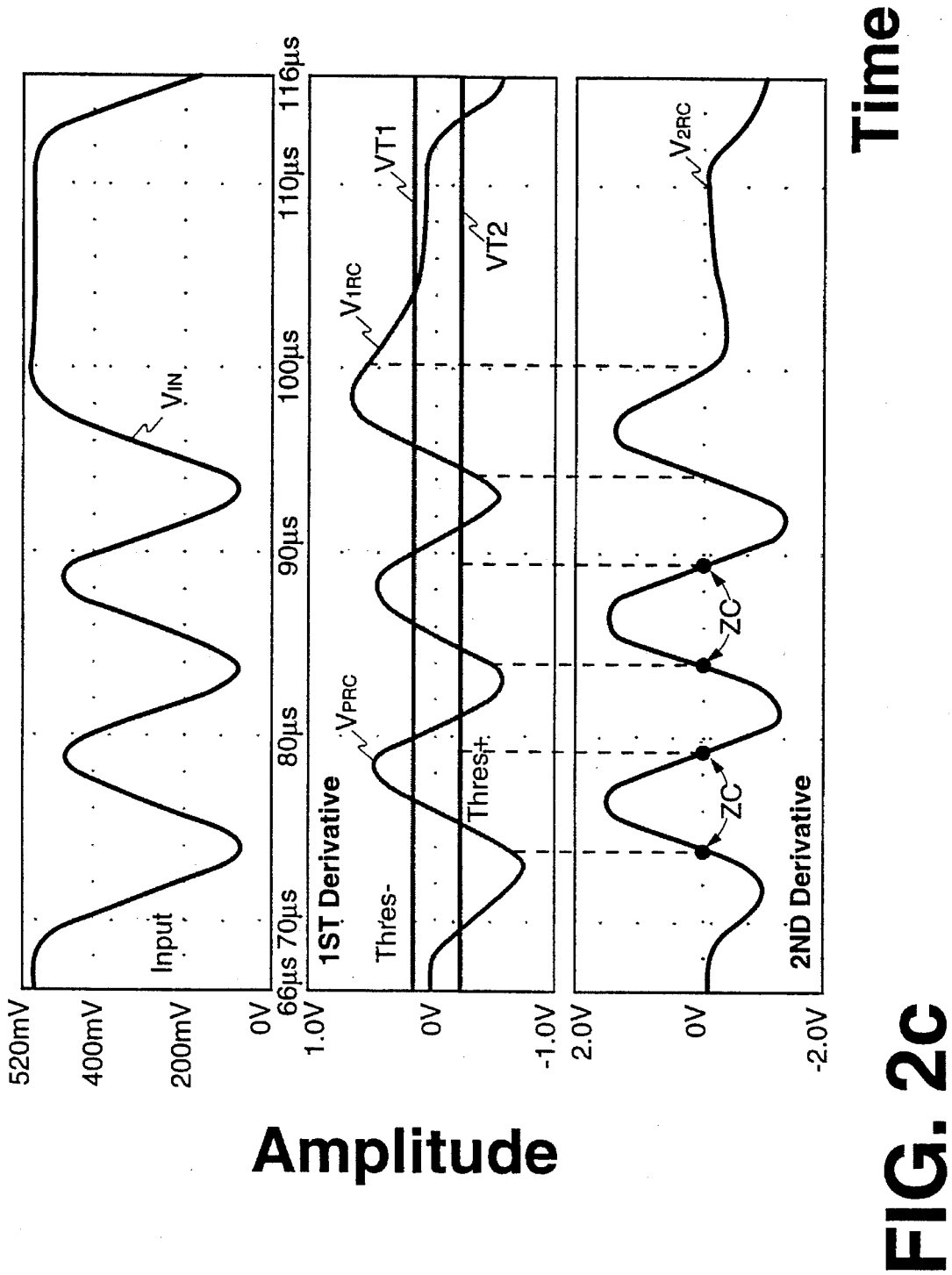
FIG. 2c is a graph of waveforms showing the relative time alignment of the first and second derivative signals in a conventional signal processing system when misalignment occurs.

It should be noted that while there are several ways in which to take the first derivative signal, the preferred embodiment has the important benefit of maintaining proper alignment of the first and second derivative signals V1 and V2 by generating the second derivative V2 at twice the frequency of the first derivative signal V1, as explained further below. Use of two delay elements allows the first derivative to be taken in any of three ways—that is, by calculating either (i) A–C, (ii) B–C, or (iii) A–B. Method (i), utilizing two delay elements and hence two delay periods to calculate the first derivative, yields a poorer approximation of the first derivative than methods (ii) and (iii), in which only a single delay period is utilized. It would thus appear to be most desirable to select method (ii) or (iii) to obtain the highest accuracy of the first derivative signal V1. However, method (i) may be preferable because it results in proper alignment of the first and second derivatives, as shown in FIG. 2b. In FIG. 2b, the peak voltage Vp of the first derivative signal V1 is directly above the zero crossing ZC of the second derivative signal V2. In contrast, as shown in FIG. 2c, the peak voltage Vprc of the first derivative signal V1rc derived from a conventional analog differentiator may be misaligned with the second derivative signal V2rc, causing missed zero crossings or detection of false zero crossings. The poorer approximation of the first derivative in the preferred embodiment is acceptable because the precise value of the first derivative is not necessarily important, as the first derivative signal V1 is used primarily for determining an enabling period during which zero crossings may be detected.

Figure 2D:
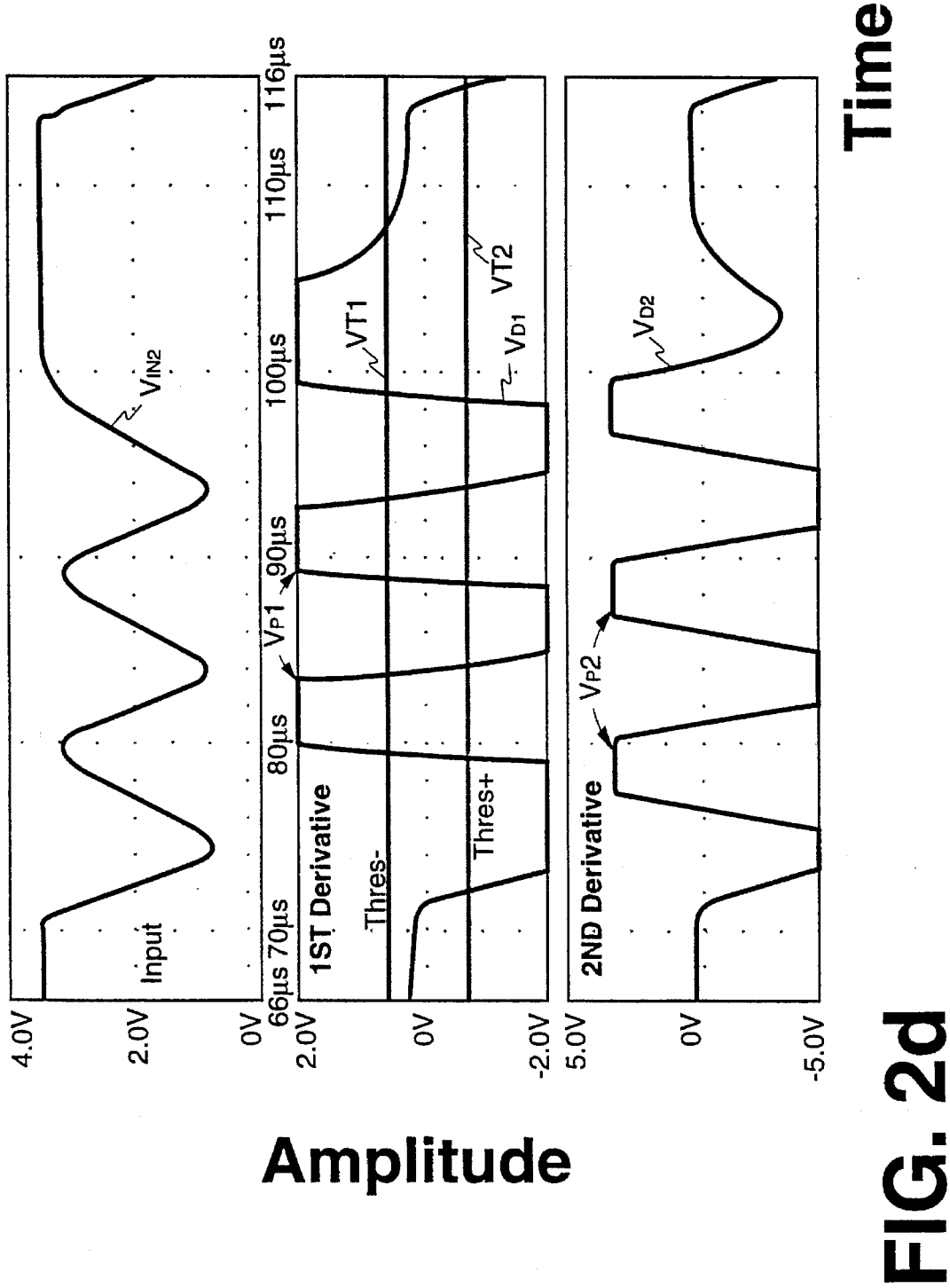
FIG. 2d is a graph of waveforms representative of the operation of a system in FIG. 2a when clipping of the first derivative signal occurs.
Figure 2E:
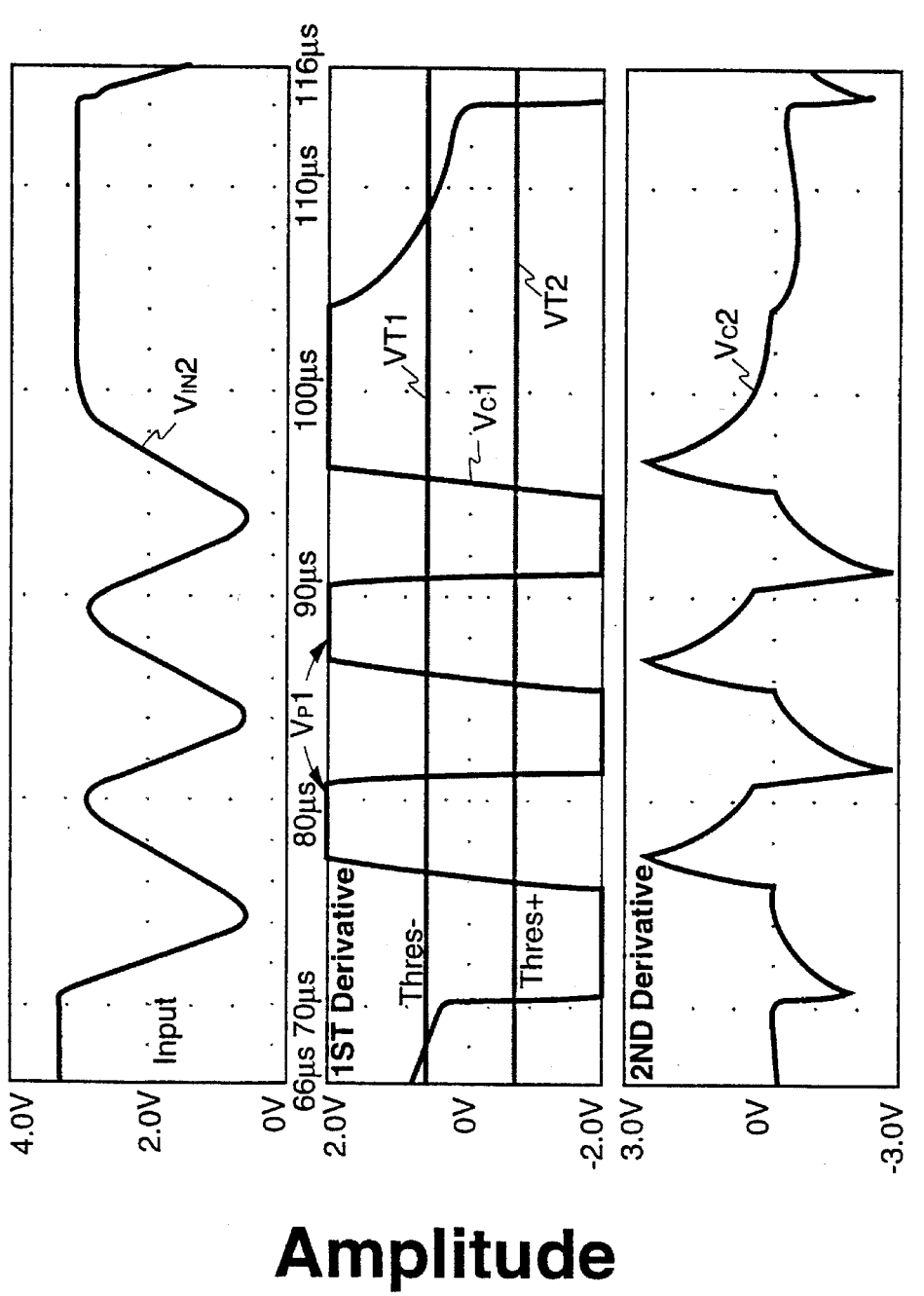
FIG. 2e depicts waveforms showing distortion of the second derivative signal in a conventional signal processing system when clipping of the first derivative signal occurs.

The system described herein also advantageously reduces sensitivity to clipping of the first derivative signal. Clipping may occur where the first derivative signal V1 is limited by the supply rails. Examples of clipping are shown with respect to FIGS. 2d–2e. As shown, clipped first derivative signal Vc1 exhibits relatively flat peaks Vp1 that cause distortion of the second derivative signal Vc2. Thus, zero crossings of the second derivative signal Vc2 may be distorted leading to inaccurate decoding. Generally, clipping increases with the length of the delay period selected. However, clipping may also occur in conventional systems and is more deleterious in such systems because such methods use the first derivative signal Vc1 to derive the second derivative signal Vc2, as shown in FIG. 2e. Thus, in those systems, clipping of the first derivative signal affects the precision of the second derivative signal. However, the described embodiment derives the second derivative signal independently of the first derivative signal; thus, clipping of the first derivative signal will not impact the precision of the second derivative signal, as shown in FIG. 2d (some clipping of the second derivative may result from other effects such as the amplitude of the input signal Vin). This is a major advantage particularly in handheld scanners where, because of the increasing demand for smaller supply voltages and greater depth of field, clipping may likely occur due to larger ranges of input amplitudes.

A further benefit resulting from use of fixed delay intervals of delay line circuits is that the value of the second derivative V2 occurs at a predictable time after the signal enters the delay elements 24 and 26. Threshold decision limits may therefore be established based on the value of the filtered input signal on line 23 in advance of the edge detection operation. Advance threshold setting results in more reliable edge detection during transient conditions, such as when a scanning beam moves from a dark colored area of a package into the light colored background area of a bar code symbol.

In an embodiment where threshold signal VT1 is variable, there may be provided an additional advantage in the reading of the initial portion of a bar code. Because the first transition of the input signal Vin will ordinarily be a white-to-black (i.e, space-to-bar) transition, the system may set up the threshold signal VT1 with reference to the filtered input signal on line 23 because the delay period is predictable from the filtered input signal on line 23 to the derivative. This method results in more reliable edge detection during transient conditions, such as when a scanning beam moves from a dark colored area of a package into the light colored background area of a bar code symbol.

A device according to the preferred embodiment of the invention may therefore exhibit one or more of the following advantages:

attenuation of high frequency noise in a bar code scanning system without the need for a relatively complex low pass filter in the signal processing chain;

the benefit of the second derivative detection processing with minimal distortion due to varying group delay;

accurate reading of bar code labels by detecting zero crossings of the second derivative of the input signal while maintaining constant group delay and attenuating high frequency noise;

proper alignment of the first and second derivatives of an input signal so that the first derivative signal may be used to determine more accurately the zero crossings of the second derivative signal;

suitable dynamic range of operation without enlargement of the power supply voltage requirements while minimizing the effects of clipping of signal amplitudes.

Alternative Embodiments

Figure 14:
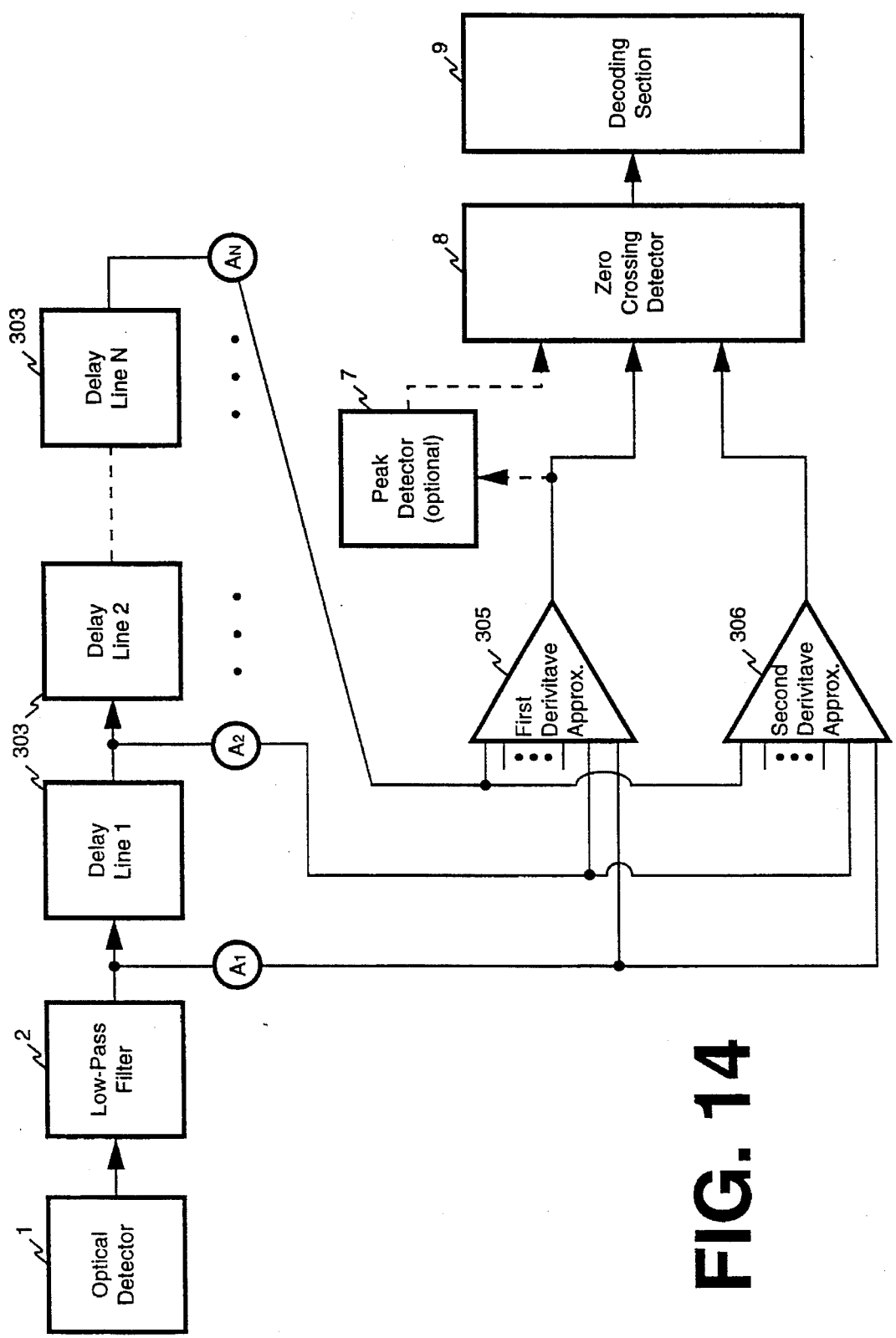
FIG. 14 is a block diagram of an embodiment of the present invention employing a plurality of delay lines to generate a more precise approximation of a second derivative from a sampled input signal.

FIG. 14 is a block diagram of an embodiment in which a more precise approximation of a second derivative of the input signal is derived from samples of the input signal.

Although a first embodiment has been described having two delay elements, it is possible to obtain more precise estimates of the first and second derivatives by using more delay elements 303 (although possibly with shorter delay times) and a higher order interpolation scheme. Examples of suitable numerical estimation methods are given in R. W. Hamming, "Numerical Methods for Scientists and Engineers" (2d ed. 1973). These methods are based on approximating the signal with some polynomial over some limited range and using the derivative of this polynomial as the estimate of the true derivative within the limited range.

In another alternative embodiment, edge detection is not accomplished by utilization of information from first derivative signals on lines 31 and 32. Rather, delay lines are once again employed, this time to determine the location of zero crossings of the approximate second derivative signal V2 and detect valid transitions of small amplitude. This method is explained with reference to FIGS. 9a–9c. Essentially, this method is based on assumed the presence of symmetrical signal peaks 150 and 151 on either side of a valid zero crossing 155 of the second derivative signal 152 (corresponding to V2 of FIG. 2b), as shown in FIG. 9b. Two delay elements 120 and 121 are used to "sample" the second derivative signal 152 at two intervals of time. Thus, a first delayed second derivative signal is generated on line 131 and a second delayed second derivative signal is generated on line 132. These two signals 131 and 132 are identical to the second derivative signal 152 except for the fact that they are time-shifted. The circuit looks for zero crossings of the first delayed second derivative signal on line 131. A zero crossing 155 is detected only when both the second derivative signal 152 and the second delayed second derivative signal 132 are outside the deadband region defined by positive threshold 153 and negative threshold 154, indicating signal peaks 150 and 151 exist to either side of zero crossing 155. It should be noted that the above method using delay elements 120 and 121 to detect zero crossings of the second derivative signal 152 does not require use of first derivative signal information. However, it does require knowledge of how far apart to expect the signal peaks 150 and 151, 100–400 nanoseconds being typical for fixed scanners and 2–3 microseconds for handheld scanners. The delay period of delay elements 120 and 121 may thus be chosen based on system parameters. Note that the absolute value of the delay periods are not critical, as the system need not detect zero crossings at the exact top of the signal peaks but at any point while peaks 150 and 151 are outside the deadband region. The system of FIG. 9a will therefore assume a valid zero crossing 155 whenever a first portion of the second derivative signal 152 exceeds one of the two thresholds 153 and 154 a predefined time before the zero crossing 155 and a second portion of the second derivative signal 152 exceeds the other of the two thresholds 153 and 154 a predefined time after the zero crossing 155, regardless of whether the first and second signal portions of the second derivative signal 152 correspond to actual identifiable peaks 150 and 151 in the second derivative signal 152. Because this method functions best when there is symmetric time domain response, it is ideally suited for use in a system in which the second derivative signal 152 has constant group delay or linear phase response. This method also functions best with clean derivative signals and is thus ideally suited for use in a system in which the second derivative signal 152 is derived from delay lines.

It should be noted that the positive and negative threshold 153 and 154 are not the same as the threshold signals VT1 and VT2 described in conjunction with the first derivative signal. Thresholds 153 and 154 may be of relatively low amplitude and function to prevent the system from providing erroneous output when there is no input signal. The reason that thresholds 153 and 154 may be relatively low is because of the advantageous noise rejection features of the described embodiment. The system will not respond to a single noise glitch but only to a noise pattern that satisfies the same conditions as required to produce a valid output. In other words, in order for the system to produce an invalid output due to noise, there must be a positive noise glitch exceeding threshold 153 followed by a zero crossing followed by a negative noise glitch below threshold 154 (or vice versa) within the time fixed by the delay periods. Because such noise patterns are less frequent than single voltage spikes that would cause invalid outputs in other systems, the described embodiment is less sensitive to noise and may therefore utilize lower thresholds. The use of lower threshold enables detecting more capability of detecting zero crossings where the second derivative signal 152 is of low amplitude. In addition, this embodiment may advantageously fix thresholds 153 and 154 in order to minimize sensitivity to clipping of the derivative signals.

Figure 9A:
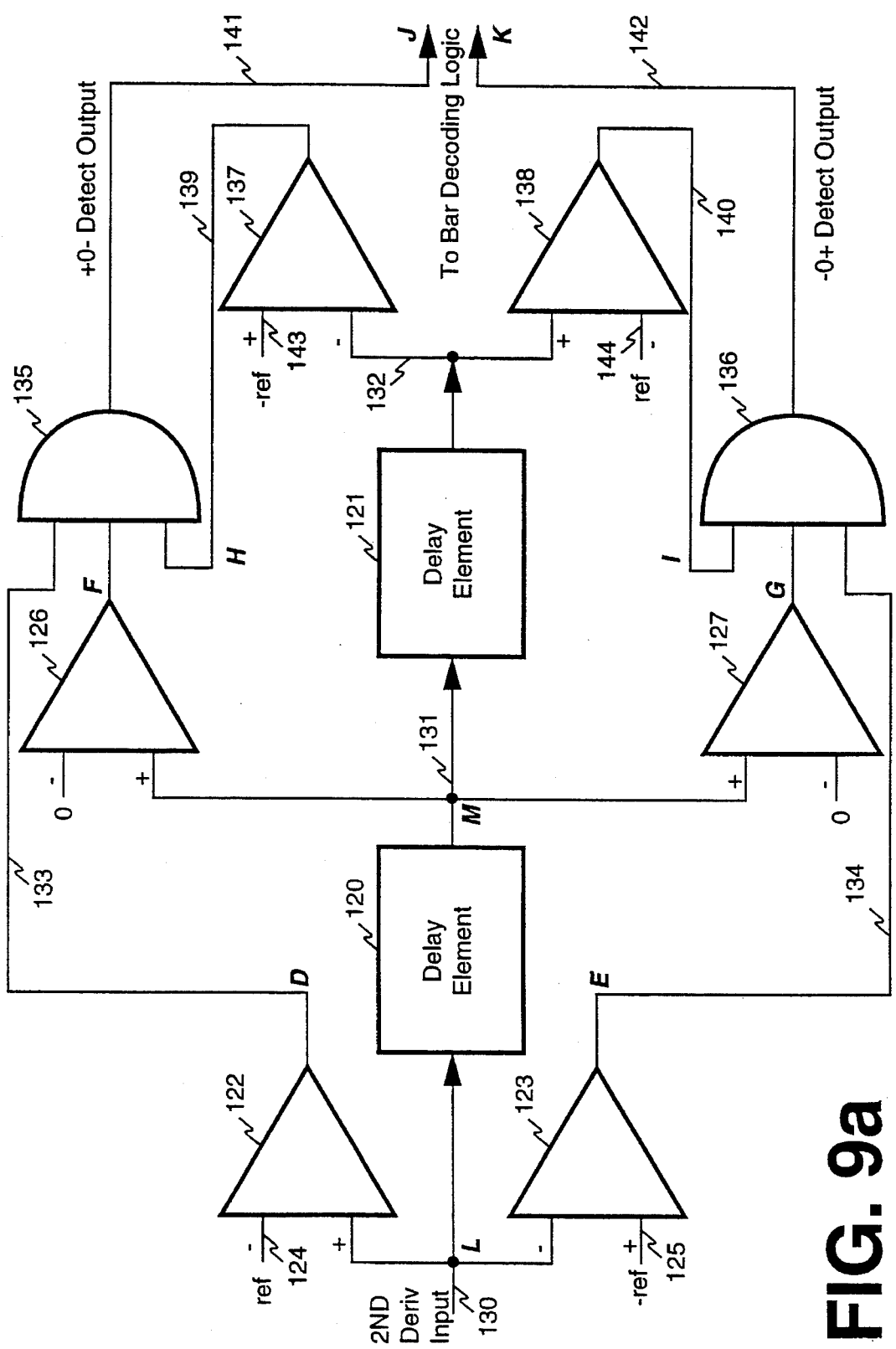
FIG. 9a is a block diagram of a circuit using delay lines to detect zero crossings of a signal.
Figure 9B:
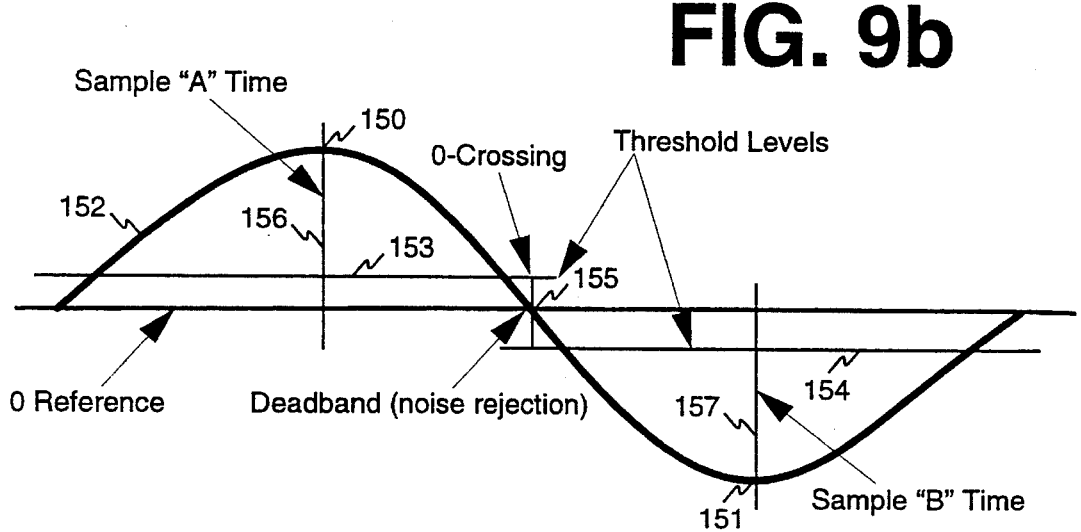

An embodiment performing the above function is shown in FIG. 9a. The second derivative signal 152 is sent on line 130 to a first delay element 120 to generate a first delayed second derivative signal on line 131. The output of delay element 120 is sent to a second delay element 121 in order to generate a second delayed second derivative signal on line 132. The second derivative signal 152 on line 130 is compared with the positive threshold 153 on line 124 by a comparator 122. A logical HIGH is generated by the comparator 122 when the second derivative signal on line 130 exceeds the positive threshold 153. Similarly, when the second derivative signal 152 on line 130 is below the negative threshold 154 on line 125, a comparator 123 generates a logical HIGH signal on line 134. Likewise, when the first delayed second derivative signal on line 131 exceeds zero, a comparator 126 generates a logical HIGH, and when the signal on line 131 is below zero, a comparator 127 generates a logical HIGH. In the same manner, when the second delayed second derivative signal on line 132 exceeds the positive threshold 153 on line 144, a comparator 138 generates a logical HIGH on line 140, and when the signal on line 132 is below the negative threshold 154 on line 143, a comparator 137 generates a logical HIGH on line 139. A logical AND gate 135 generates a HIGH signal on line 141 when the second derivative signal on line 130 exceeds the positive threshold 154, the second delayed second derivative signal on line 132 is below the negative threshold 137, and the first delayed second derivative signal on line 131 exceeds zero. The AND gate 135 will switch states when the first delayed second derivative signal on line 131 passes through zero. Similarly, a logical AND gate 136 generates a HIGH signal on line 142 when the peaks 150 and 151 exceed opposite thresholds 153 and 154 at sample times 156 and 157. In essence, a rising edge from LOW to HIGH on output of AND gate 135 indicates the beginning of a bar, and a rising edge on the output of AND gate 136 indicates the end of a bar. Note that comparators 122 and 123 are configured in the opposite manner from comparators 135 and 136, so that the system looks for peaks of opposite polarity to either side of the zero crossing 155 no matter whether the first peak is positive or negative. The information on lines 141 and 142 is sent to decoding logic (not shown) in order to decode the bar code label. The decoding logic (not shown) may use a timer (not shown) to calculate the time difference between output signals of gates 135 and 136 in order to calculate the widths of bars and spaces.

Figure 10:
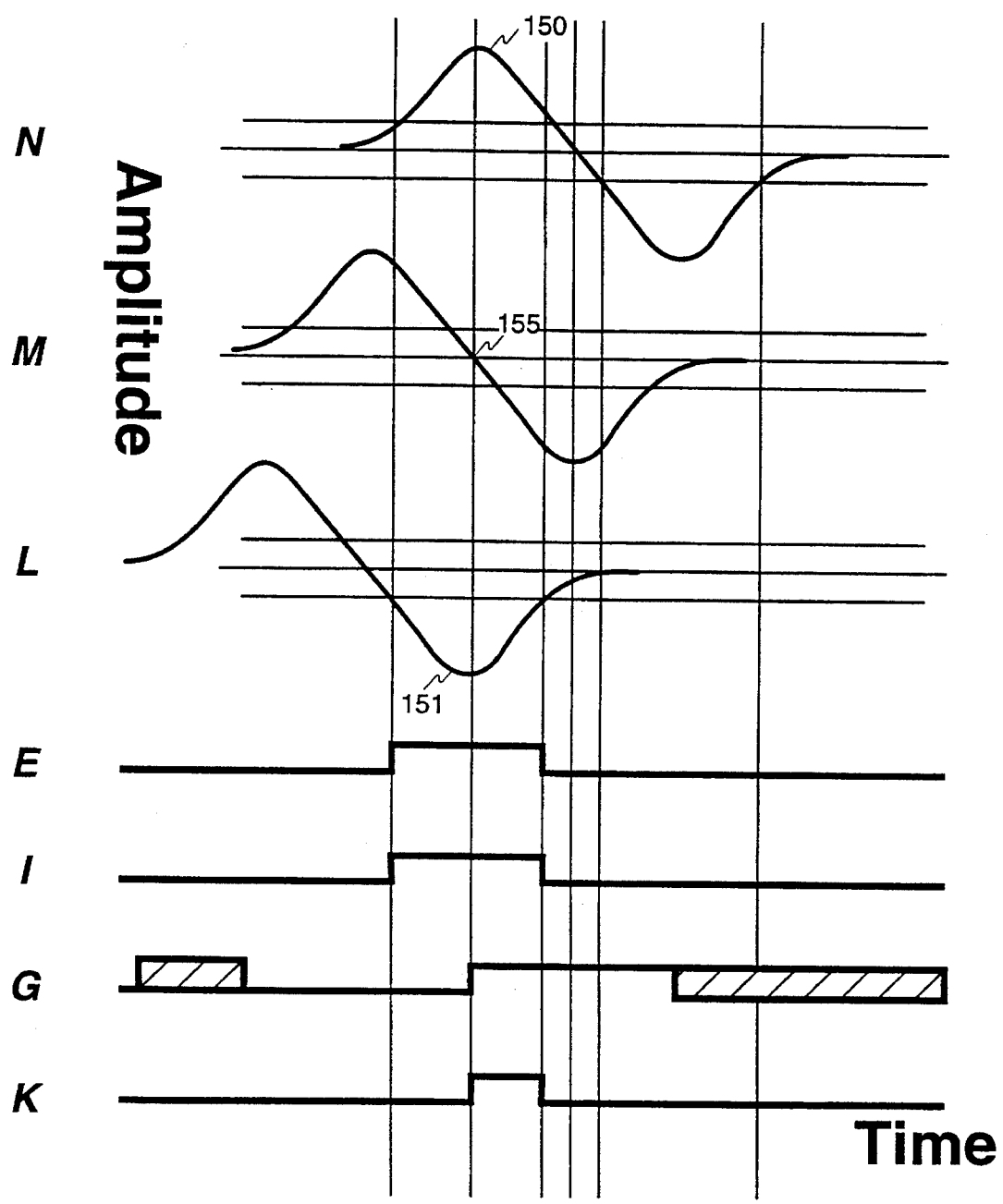

Waveform examples of the above embodiment in operation are shown in FIG. 10 corresponding to signals at selected points labelled on FIG. 9a. As shown in FIG. 10, signals N, M, and L are identical except for their positions in time and correspond to the second derivative signal 152 on line 130, the first delayed second derivative signal on line 131, and second delayed second derivative signal on line 132, respectively. As can be seen, the system effectively detects a zero crossing 155 at a time when the first peak 151 has been shifted back in relative time and the second peak 150 of opposite polarity has been shifted forward in relative time, thereby properly aligning the two peaks 150 and 151 with the zero crossing 155. Waveform E shows the output of comparator 123 as HIGH when the second derivative signal 152 is below the negative threshold 154. Waveform I shows the output of comparator 144 as HIGH when the second delayed second derivative signal on line 132 is above the positive threshold 153. Waveform G shows the output of comparator 127 as HIGH when the first delayed second derivative signal is below zero (the shaded portion indicating that the value is indeterminate). Waveform K shows that the output of AND gate 136 goes HIGH at the time of the zero crossing 155.

One problem that may be experienced with the method described in the preceding few paragraphs is that when edges get close together, such as, for example, when two bars are separated by only a single space, the exact point of the zero crossing 155 may be difficult precisely to determine due to intersymbol interference. This problem is explained with reference to FIG. 9c. A second derivative waveform 165 is shown distorted by intersymbol interference. The positive and negative signal peaks 160 and 161 of the second derivative waveform 165 may become asymmetrical causing the true zero-crossing 163 to shift to a later false zero crossing 164. The amount of shifting may be estimated by calculating the slope 162 of the second derivative waveform 165 at the false zero crossing 164 (using the delayed signals on lines 130 and 132 as points on the line) and the relative amplitude of the signal peaks 160 and 161. The slope 162 is essentially the third derivative of the input signal Vin. As the relationship of amplitude of signal peaks 160 and 161 and the signal slope 162 is nonlinear, a look-up table (not shown) could be advantageously utilized based on the ratio of the positive and negative signal peak amplitudes in order to quickly determine and correct the shift 166 of the true zero crossing 163.

Another similar way to determine the shift 166 is by determining the relative difference in amplitude of peaks 160 and 161. In such a case, because the values of the peaks 160 and 161 are available simultaneously (by virtue of using delay lines), the values may be added together. For a perfectly symmetrical waveform, the values would add to zero. Otherwise, the magnitude and polarity of the difference in the values would indicate the displacement of the true zero crossing 163. The magnitude and polarity error may be converted to low resolution digital values and used as inputs to a look-up table (not shown) in order to provide a correction factor for the shift 166.

Another way to determine the shift 166 of the zero crossing 163 is by measuring the relative pulse widths 170 and 171 of the signal 165. When the waveform is symmetric, the pulse widths 170 and 171 should be identical. The difference in the pulse widths 170 and 171 indicate the amount of the shift 166.

Figure 9C:
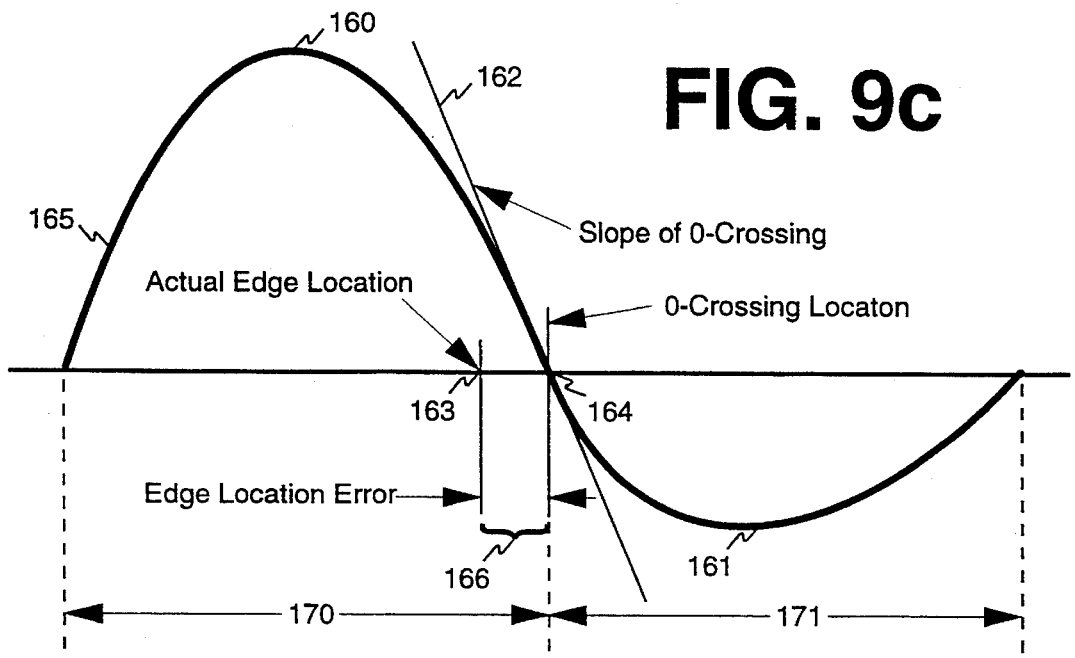
FIG. 9c is a waveform diagram depicting asymmetries caused by intersymbol interference.
Figure 12:
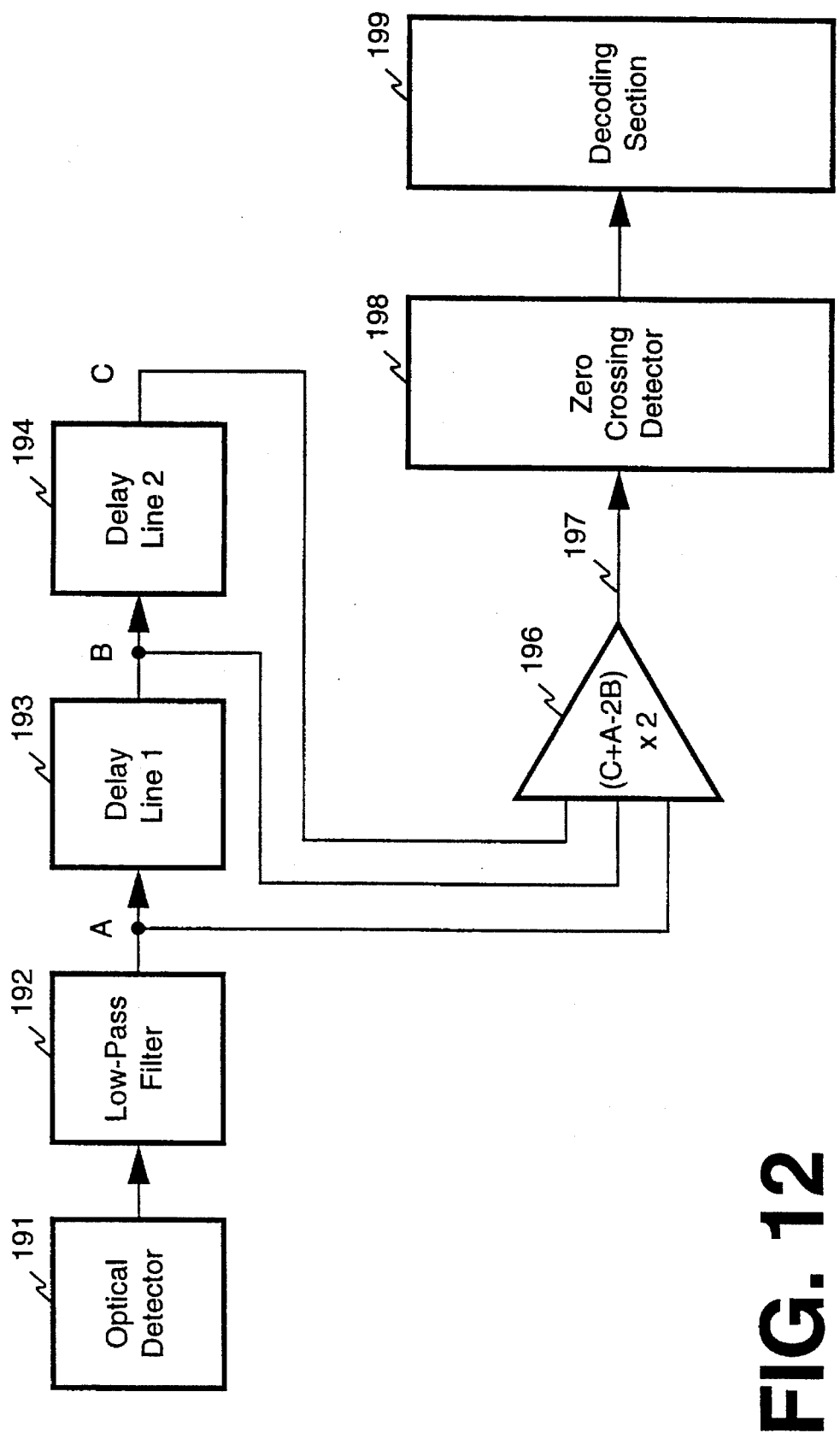
FIG. 12 is a system diagram of an alternative embodiment of the present invention wherein zero crossings of the second derivative are determined without generating a first derivative of the input signal.

FIG. 12 is a system level diagram incorporating the zero crossing method explained in FIGS. 9a–9c. The system of FIG. 12 is similar to that of FIG. 2a but, as noted previously, functions without generating an approximation of the first derivative signal.

While the embodiments shown so far have been related to a laser scanning bar code reader, it should be appreciated that the same circuit can be utilized in readers that have other types of signal generation methods. In particular, the electrical signal that represents the light reflected from a label could come from a CCD imaging device. The characteristics of such a signal are essentially identical to those from a laser scanner and therefore this invention can be used advantageously in such devices to effectively process the signal for edge detection. Moreover, a CCD imaging device already has synchronous input and is therefore well suited for use with the present invention. This method can also be done in real time.

Another alternative embodiment may employ sample-and-hold circuits to accomplish the same benefits of the delay line signal processing described previously. An example of such an alternative embodiment is described with reference to FIGS. 13a–13f. The embodiment utilizes three sample-and-hold circuits 250–252 to sample at various intervals t0, t1, t2 . . . as shown on FIG. 13f, where the waveform 280 corresponds to the input signal Vin. The first sample-and-hold circuit 250 samples at time interval t0, t3, t6, . . . , the second sample-and-hold circuit 251 at time interval t1, t4, t7, . . . , and the third sample-and-hold circuit 252 at time interval t2, t5, t8, . . . Thus, at any given time the system has information pertaining to at least three consecutive sample times. The outputs of the sample-and-hold circuits 250–252 are sent to arithmetic block 208 to calculate the first and second derivative signals V1 and V2 according to the formulas "A−C" and "A+C−2B" discussed before. One circuit 253 performs the first derivative calculation and a second circuit 254 performs the second derivative calculation. Because only two calculating circuits 253 and 254 are used, additional logic is necessary to determine which sample-and-hold circuits 250–252 correspond to the A, B, and C signals at any given time and to connect the proper sample-and-hold circuits to the proper inputs of calculating circuits 253 and 254 at the proper time.

Figure 13A:
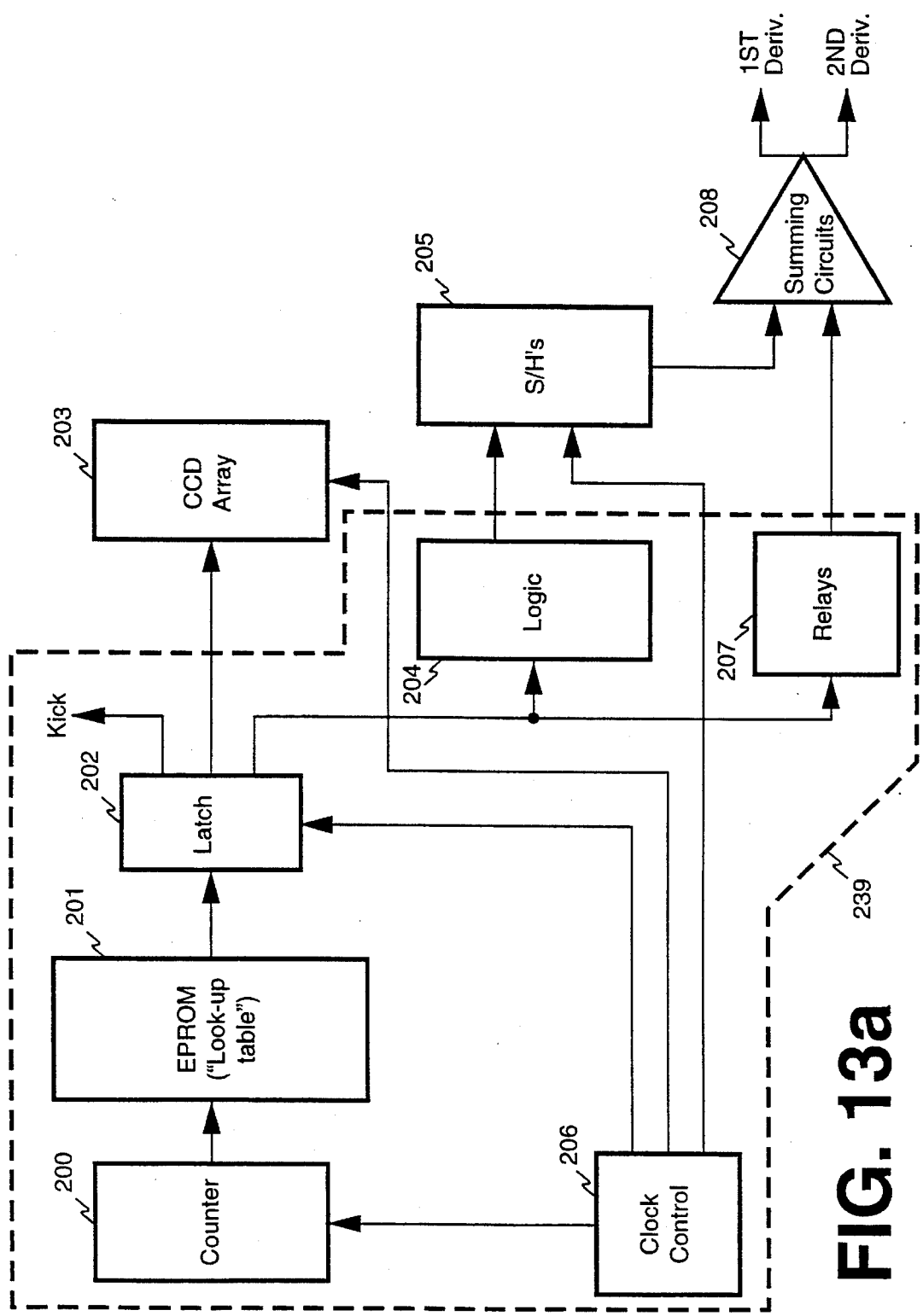
FIG. 13a is a block diagram showing an alternative embodiment of the present invention with sample-and-hold circuits.

With reference to the embodiment shown in FIG. 13a, a controller 239 provides, among other things, selective coupling of sample-and-hold circuits 250–252 to the inputs of calculating circuits 253 and 254. A clock control 206 provides a synchronous clock signal 262 to a counter 200. With each pulse of clock signal 262 the counter 200 increments, transferring the system to the next state. Each new state corresponds to a new sample period t0, t1, t2 . . . at which time the sample-and-hold circuits 250–252 are enabled as further explained below. The counter 200 is connected to an EPROM 201 which functions as a look-up table containing command data for the given state. The present state of the counter 200 is used as the address of the EPROM 201. The command data of the EPROM 201 for the selected state is latched by latch 202. The output of the latch is sent to control the CCD array 203, the enabling logic 204 for the sample-and-hold circuits 250–252 (shown collectively as the S/H block 205 on FIG. 13a), and relays REL1–REL9 (shown collectively as the relay block 207 on FIG. 13a). The relays REL1–REL9 (shown in FIG. 13d) control the connections to the calculation circuits 253 and 254 of the arithmetic block 208. Although the described embodiment utilizes a counter 200 and EPROM 201 to perform the command logic, it should be noted that a finite state machine could be easily substituted to perform the same function. Further, although the described embodiment utilizes a CCD array input, it should be noted that the sample-and-hold circuits 250–252 could also operate on an analog input signal. Further, because a CCD imaging device has an intrinsic sample-and-hold, a similar system to that described herein may be created with only two sample-and-hold circuits while using the CCD imaging device as a substitute for the third.

Figure 13B:
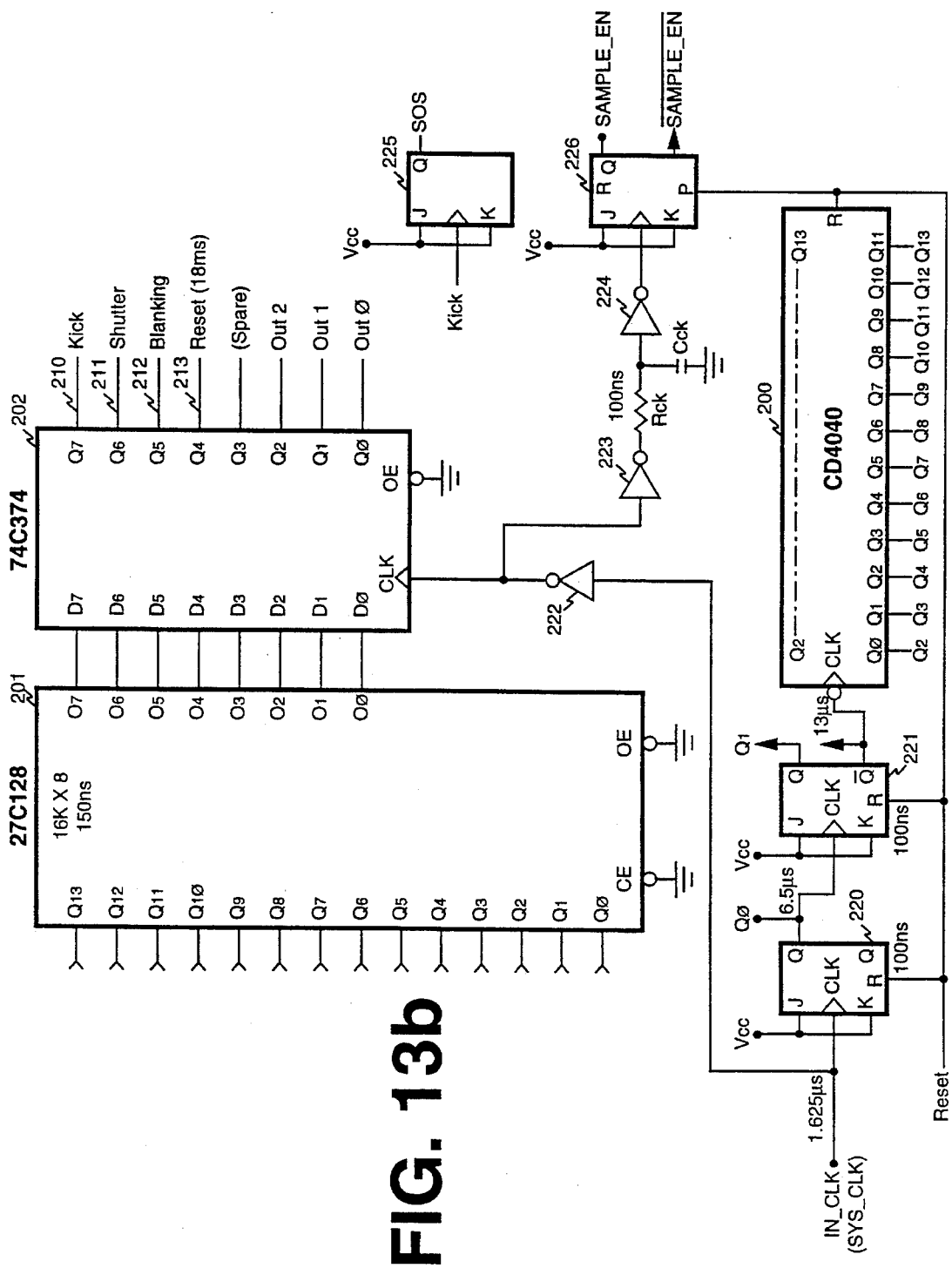
Figure 13C:
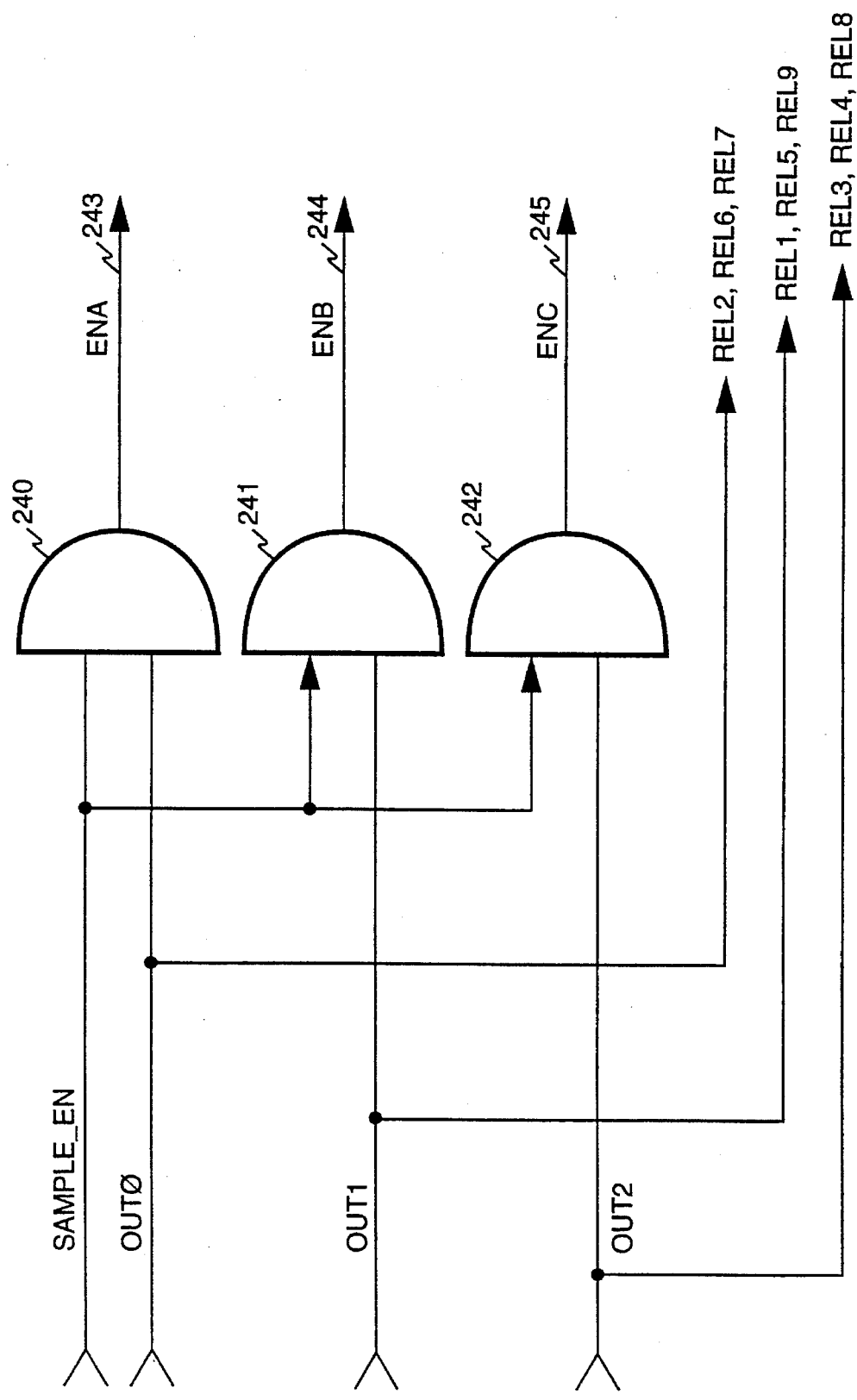
Figure 13D:
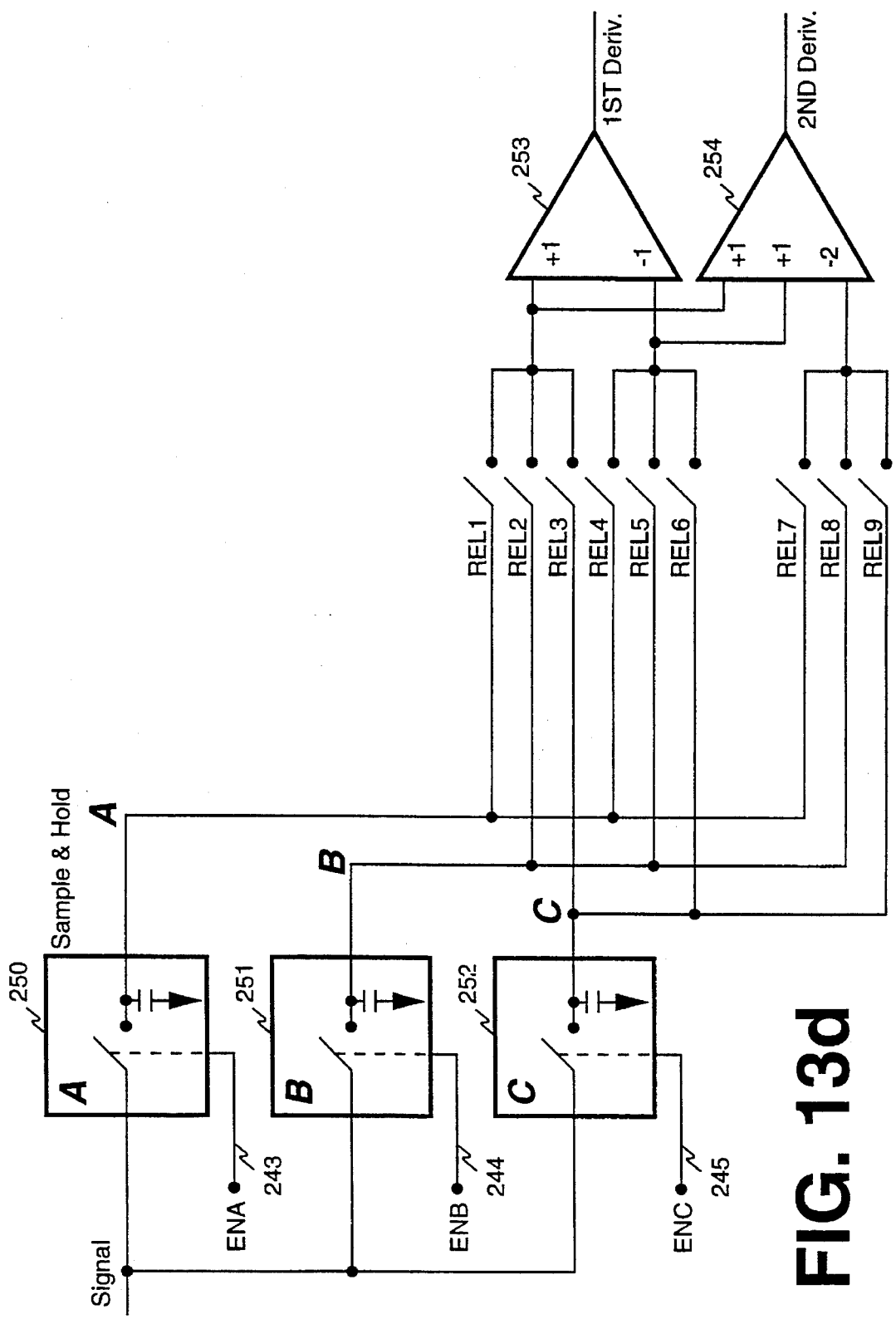
Figure 13E:
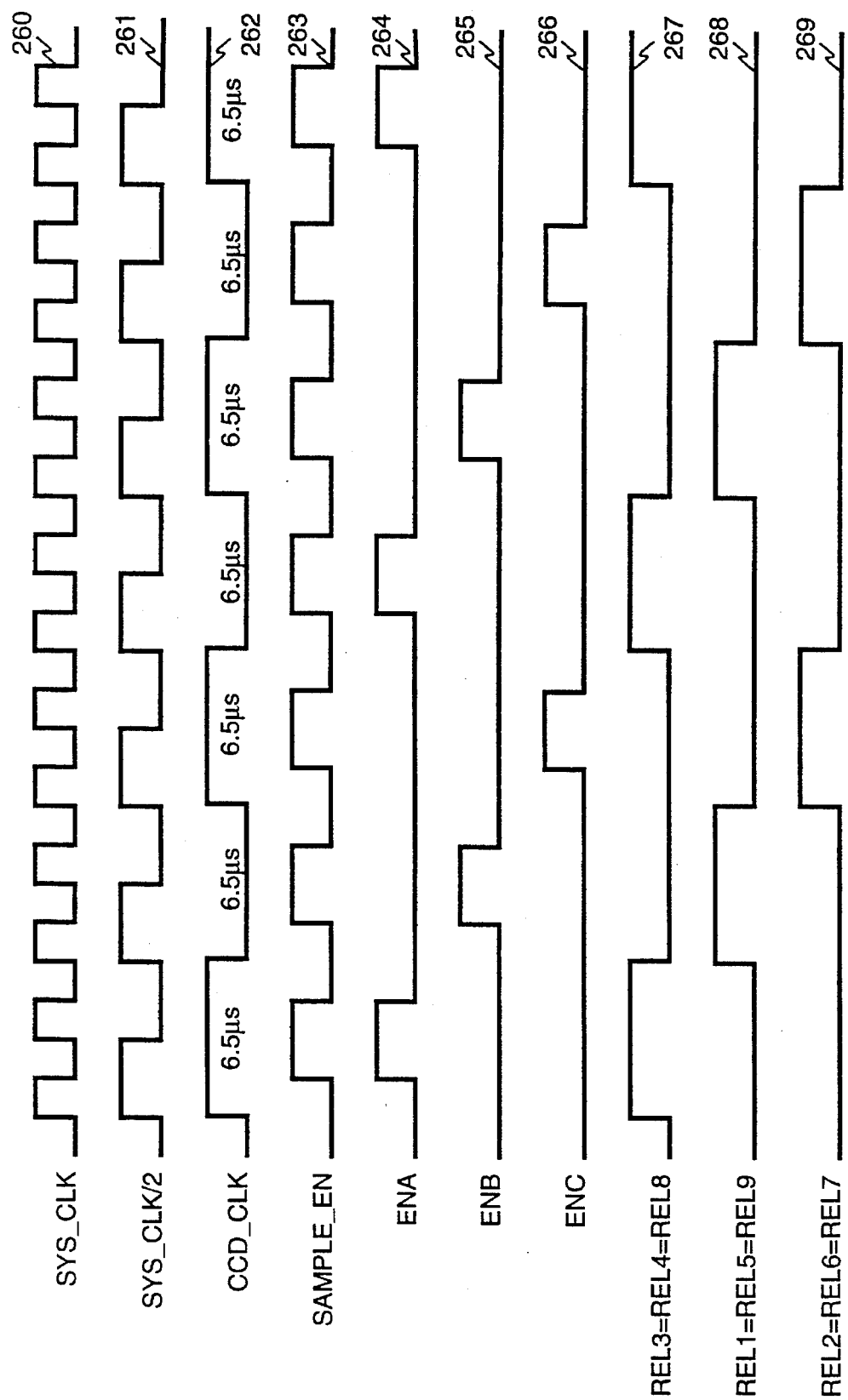
FIGS. 13e–f are timing diagrams used in conjunction with the alternative embodiment shown in FIGS. 13b–d.
Figure 13F:
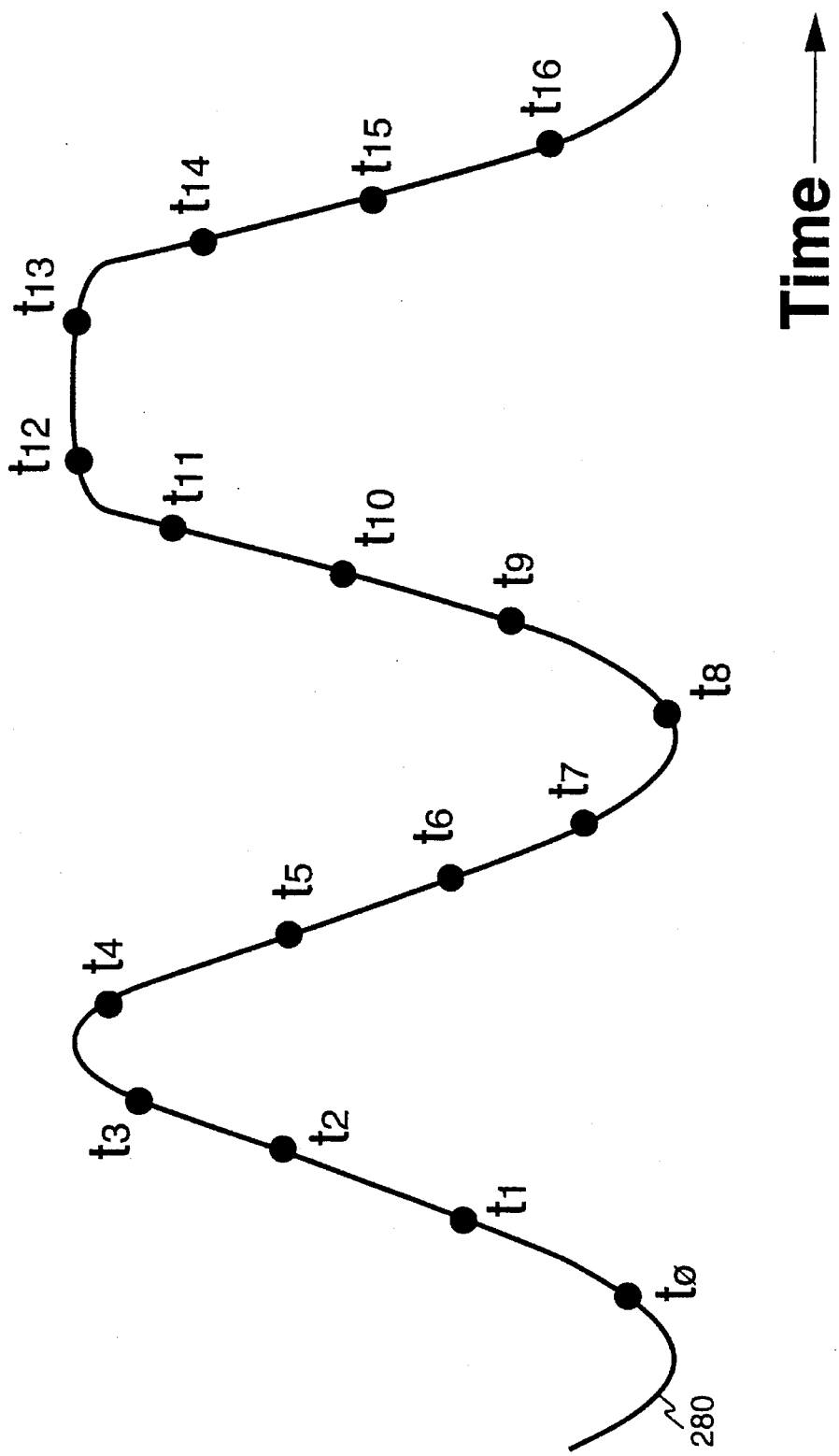

The embodiment of FIG. 13a is shown with more detail in FIGS. 13b–13d. Referring to FIG. 13b, a clock signal 260 of roughly 616 kHz is provided to a J-K flip-flop 220 which is in turn connected to another J-K flip-flop 221 for the purpose of producing a clock signal 262 at roughly one quarter the speed, or 154 kHz. The output of the J-K flip-flop 221 sends the clock signal 262 to the counter 200. The output of the counter 200 is connected to the address of a 16k×8 EPROM 201. The output of EPROM 201 is latched by latch 202. The system clock signal 260 is also inverted by inverter 222 to provide an inverse clock signal for the latch 202. The output of inverter 222 is then connected to two inverters 223 and 224 separated by a capacitor Cck and a resistor Rck which delay the signal approximately 100 ns. The output of inverter 224 is connected to a J-K flip-flop 226 which halves the signal frequency. Thus, the output of the J-K flip-flop 226 is a delayed sample clock signal 263 inputs of the calculation circuits 253 and 254 corresponding to the "A" input described earlier. Likewise, the next three relays REL4–REL6 connect the outputs of the sample-and-hold circuits 250–252 to the inputs of the calculation circuits 253 and 254 corresponding to the "B" input described earlier. In the same manner, the final three relays REL7–REL9 connect the outputs of the sample-and-hold circuits 250–252 to the inputs of the calculation circuits 253 and 254 corresponding to the "C" input described earlier. Below is a table showing the proper connections for each given timing period:

|    | 1st Der.           | 2nd Deriv.                  | Calculations |             |
|----|--------------------|-----------------------------|--------------|-------------|
| 0  | $V_2 - V_0$        | $V_2 + V_0 - 2V_1$          | A – C        | C + A – 2B  |
| 1  | $V_3 - V_1$        | $V_3 + V_1 - 2V_2$          | B – A        | A + B – 2C  |
| 2  | $V_4 - V_2$        | $V_4 + V_2 - 2V_3$          | C – B        | B + C – 2A  |
| 3  | $V_5 - V_3$        | $V_5 + V_3 - 2V_4$          | A – C        | C + A – 2B  |
| 4  | $V_6 - V_4$        | $V_6 + V_4 - 2V_5$          | B – A        | A + B – 2C  |
| 5  | $V_7 - V_5$        | $V_7 + V_5 - 2V_6$          | C – B        | B + C – 2A  |
| 6  | $V_8 - V_6$        | $V_8 + V_6 - 2V_7$          | A – C        | C + A – 2B  |
| 7  | $V_9 - V_7$        | $V_9 + V_7 - 2V_8$          | B – A        | A + B – 2C  |
| 8  | $V_{10} - V_8$     | $V_{10} + V_8 - 2V_9$       | C – B        | B + C – 2A  |
| 9  | $V_{11} - V_9$     | $V_{11} + V_9 - 2V_{10}$    | A – C        | C + A – 2B  |
| 10 | $V_{12} - V_{10}$  | $V_{12} + V_{10} - 2V_{11}$ | B – A        | A + B – 2C  |
| .  | .                  | .                           |              |             |
| N  | $V_{(N+2)} - V_N$  | $V_{(N+2)} + V_N - 2V_{N+1}$ |             |             | representing a delayed version of clock signal 260 at half the frequency. As shown in FIG. 13e, the delayed sample clock signal 263 provides a positive pulse during each half period of the clock signal 262 which is used to control the CCD array 203. The use of the delayed clock signal 263 enables the sampling of the CCD array 203 output by the sample-and-hold circuits 250–252 after transitory conditions have settled, thus providing a clean and accurate input signal.

The output of the latch 202 is used to control various circuitry in the rest of the system. A kick signal 210 output from the latch 202 resets the circuitry in a known state at the beginning of a scan line. Three CCD control signals 211–213 are used to control the CCD array. Three logic signals OUT0–OUT2 are used to control the enabling of the sample-and hold circuits 250–252 and the relays REL1–REL9. All three sample-and-hold signals 250–252 are connected together to receive the source signal provided by the CCD array 203. As the three sample-and-hold circuits 250–252 alternate in collecting data, the logic signals OUT0–OUT2 ensure that only one of the three sample-and-hold circuits 250–252 is enabled at a given time.

With reference to FIG. 13c, the logic signals OUT0–OUT2 are individually logically ANDed by logic gates 240–242 with the delayed sample clock signal 263 in order to provide enabling signals 243–245 to sample-and-hold circuits 250–252, respectively. Each of the three sample-and-hold circuits 250–252 are enabled only when its respective signal is high. Referring to FIG. 13e, signals 264–266 show the relative timing patterns of enabling signals 243–245, respectively.

Referring to FIG. 13d, the relays REL1–REL9 are used to control the inputs to the calculation circuits 253 and 254. The relays REL1–REL9 may be implemented as analog switches. The first three relays REL1–REL3 connect the outputs of the sample-and-hold circuits 250–252 to the For the above table, $V_N$ is the voltage sampled at time period $t_N$. Note that the pattern repeats every three sample periods. A first relay enable signal 267 corresponds to OUT0 and activates relays REL3, REL4, and REL8. A second relay enable signal 268 corresponds to OUT1 and activates relays REL1, REL5 and REL9. A third relay enable signal 269 corresponds to OUT2 and activates relays REL2, REL6 and REL7. In operation, the first and second derivative signals V1 and V2 are output from calculation circuits 253 and 254.

In another alternative embodiment, an analog shift register may be used to store input data. During each clock period, charge is transferred from one capacitor to a neighboring capacitor of the analog shift register. In such an embodiment, the system would use the stored signal from three consecutive cells of the analog shift register as inputs to the summing blocks 5 and 6 (in FIG. 2) in order to perform the same calculations as described previously.

Figure 15:
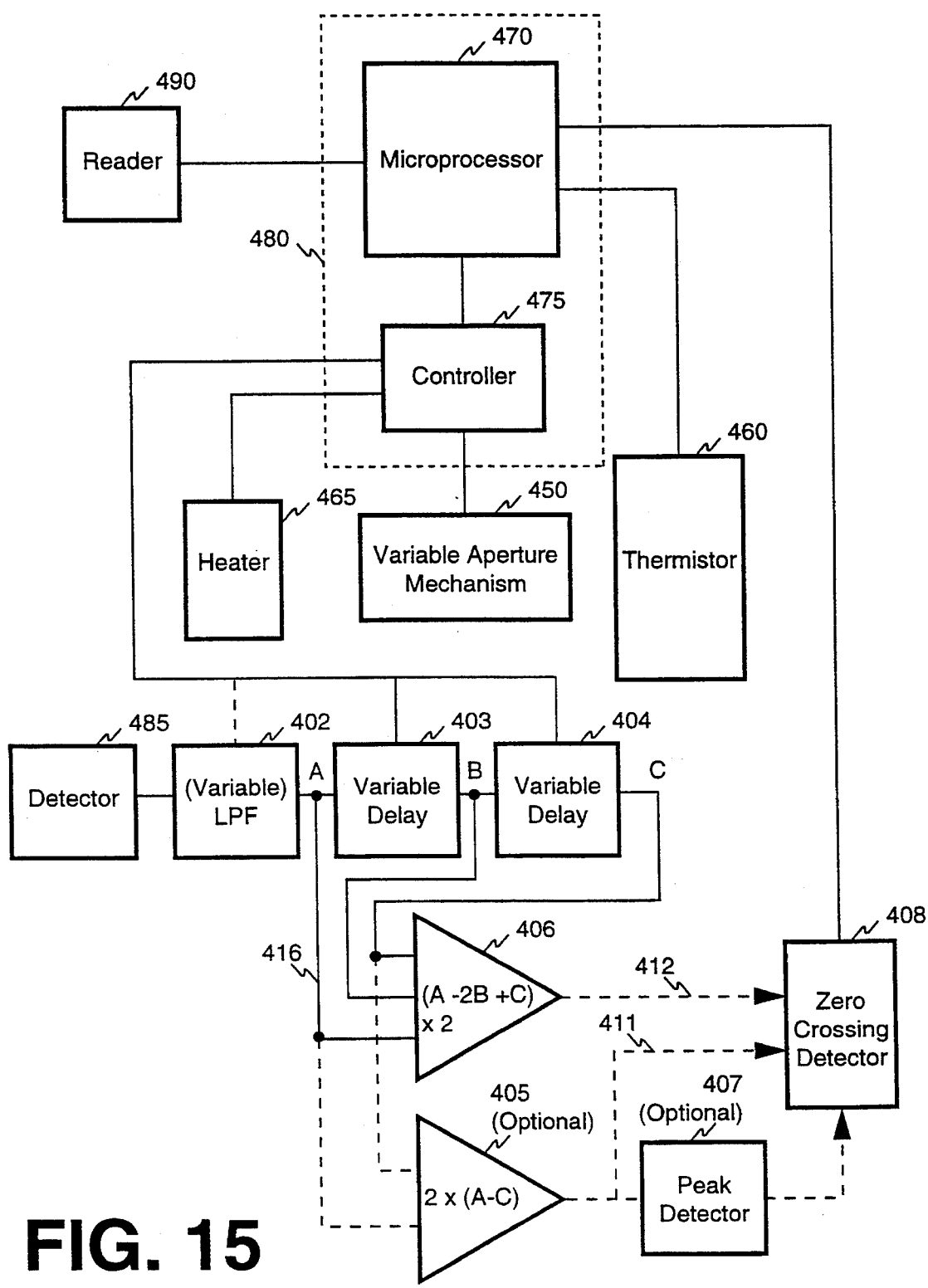
FIG. 15 is a block diagram of an alternative embodiment of the present invention including a scanner having a plurality of range settings and having delay periods adjustable to a particular range setting.

In yet another embodiment, as shown, for example, in FIG. 15, the delay elements 403 and 404 may be adjustable and therefore useful for widely varying conditions. The delay period may be dynamically adjusted to enable the reading of labels of various sizes at various distances over a wide depth of field. The delay period may be chosen as one of several discrete periods or may be a continuously variable delay period. Further, the delay period may also be matched to a particular range setting of an adjustable-focus scanner such as described in U.S. Pat. No. 5,347,121 issued on Sep. 13, 1994, and incorporated herein by reference. Thus, a different delay period could be selected for each range or zone of operation. An adjustable delay line may be used such as a ladder transconducting amplifier such as manufactured by National Semiconductor. The low-pass filter 402 could also be dynamically varied in conjunction with the delay period in order to compensate for the different expected frequencies at different ranges.

Figure 11:
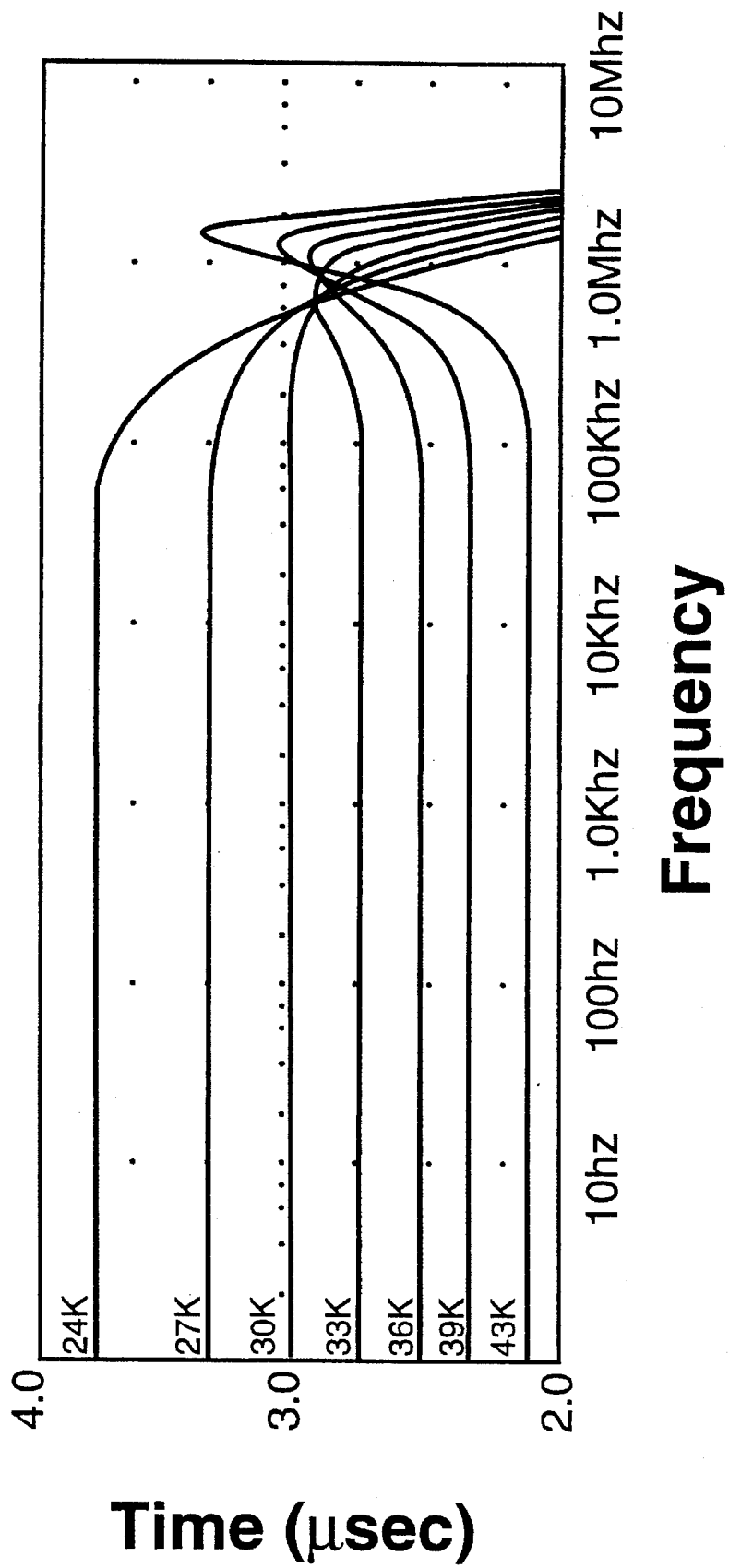
FIG. 11 is a graph showing a range of phase compensation (i.e., group delay adjustment) by adjustment of resistive components.

In some systems it may be desirable to include some delay response equalization to compensate for phase nonlinearities in some other part of the system. Delay equalization may be achieved by adjusting the delay elements 24 and 26 of the embodiment described earlier in FIGS. 3a–3f. FIG. 11 is a graph showing the various ranges of delay compensation that may be achieved by varying the value of the delay line resistors R85 and R86 (or resistors R87 and R91) from 24kΩ to 43kΩ. One or both of the delay elements 24 and 26 may be so adjusted for purposes of compensation. Generally, it can be seen from FIG. 11 that damping of delay response increases with larger values of the delay line resistors R85, R86, R87 and R91.

While the invention has thus far been described with reference to bar code label scanners, it is apparent that other systems requiring precise edge detection of analog signals may also benefit from use of the invention. In particular, the edge detection methods described herein may be advantageously applied to optical character recognition systems in which images are obtained by detecting reflected light and an electrical signal is generated in proportion to the detected light. It is also apparent that the methods and techniques described herein may be implemented in the digital domain without departing from the principles of the invention. In particular, such implementations may utilize an analog to digital converter and a microprocessor or finite state machine to perform the functions described previously.

While the invention has been particularly shown and described with reference to certain embodiments, it will be understood by those skilled in the art that various changes in form and detail may be made without departing from the spirit and scope of the invention.

What is claimed is:

1. A method for determining occurrence of transitions in an input signal comprising the steps of:

obtaining samples of the input signal separated by fixed intervals in time, approximating a second derivative of the input signal from said samples, approximating a first derivative of said input signal from said samples such that said first derivative and said second derivative are time-aligned, and detecting zero crossings of said second derivative only during times when said first derivative exceeds a threshold.

2. A method according to claim 1 wherein the step of approximating said second derivative is accomplished using the input signal and at least two of said samples.

3. A method according to claim 1 further comprising the step of filtering the input signal with a low pass filter.

4. A method according to claim 3 wherein said step of filtering the input signal is carried out with relatively constant group delay at frequencies within an expected bandwidth of the input signal, wherein said step of approximating a second derivative results in a periodic frequency response having side lobes past a first null, and wherein said step of filtering further comprises the step of attenuating said side lobes.

5. A method according to claim 1 further comprising the step of adjusting said fixed intervals in time by selecting a resistance to compensate for phase nonlinearities.

6. A method according to claim 1 wherein the input signal is generated by scanning a bar code label.

7. A method according to claim 1 wherein said first derivative is approximated using the input signal and at least one of said samples.

8. A method according to claim 1 wherein said second derivative and said first derivative are approximated over the same time period.

9. A method for determining occurrence of transitions in an input signal comprising the steps of:

obtaining samples of the input signal separated by fixed intervals in time, wherein the input signal is generated by a scanner having a plurality of range settings, adjusting said fixed intervals upon changing range settings, approximating a second derivative of the input signal from said samples, and detecting zero crossings of said second derivative.

10. An apparatus for determining the occurrence of transitions in an input signal comprising:

an optical scanner for generating an input signal from a scanned bar code label, a four-pole transitional Gaussian 12-dB filter for filtering said input signal, a double differentiator for generating an approximate second derivative of the filtered input signal, said double differentiator having relatively constant group delay over an expected input frequency range, a single differentiator for generating an approximate first derivative of the filtered input signal, said single differentiator having relatively constant group delay over the expected input frequency range, and a detection circuit for detecting zero crossings of said approximate second derivative indicative of transitions in the input signal, said detection circuit further comprising a thresholding circuit for establishing a threshold signal, whereby said detection circuit detects a valid transition of the input signal when a zero crossing of said approximate second derivative occurs during a period when said approximate first derivative exceeds said threshold signal.

11. An apparatus according to claim 10 wherein said double differentiator comprises a filter having a periodic frequency response, and wherein a first roll-off region of said periodic frequency response occurs immediately beyond the expected input frequency bandwidth.

12. An apparatus according to claim 10 wherein said single differentiator comprises a filter having a periodic frequency response, and wherein a first roll-off region of said periodic frequency response occurs immediately beyond the expected input frequency bandwidth.

13. An apparatus according to claim 10 wherein said first derivative signal is a linear approximation of the slope of the input signal.

14. An apparatus according to claim 10 wherein said four-pole transitional Gaussian 12-dB filter has relatively constant group delay over a bandwidth of interest, wherein said approximate second derivative has a periodic frequency response having side lobes past a first null, and wherein said four-pole transitional Gaussian 12-dB filter attenuates said side lobes.

15. An apparatus according to claim 10, wherein said group delay varies by no more than ten percent across the expected input frequency range.

16. An apparatus according to claim 10 wherein the input signal is generated from a solid state imaging device.

17. An apparatus according to claim 16 wherein said solid state imaging device comprises a charge-coupled device.

18. An apparatus for determining the occurrence of transitions in an input signal comprising:

an optical scanner for generating an input signal from a scanned bar code label, a double differentiator for generating an approximate second derivative of the input signal, said double differentiator having relatively constant group delay over an expected input frequency range, a single differentiator for generating an approximate first derivative of the input signal, said single differentiator having relatively constant group delay over the expected input frequency range, and said approximate first and second derivatives being time-aligned, and a detection circuit for detecting zero crossings of said approximate second derivative indicative of transitions in the input signal, said detection circuit further comprising a thresholding circuit for establishing a threshold signal, whereby said detection circuit detects a valid transition of the input signal when a zero crossing of said approximate second derivative occurs during a period when said approximate first derivative exceeds said threshold signal.

19. An apparatus according to claim 18 further comprising a low pass filter for filtering the input signal.

20. An apparatus according to claim 19 wherein said low pass filter is a four-pole transitional Gaussian 12-dB filter.

21. An apparatus for determining the occurrence of transitions in an input signal comprising:

an optical scanner for generating an input signal from a scanned bar code label, a double differentiator for generating a signal representing an approximate second derivative of the input signal, said double differentiator having relatively constant group delay over an expected input frequency range, a detection circuit for detecting zero crossings of said second derivative signal indicative of transitions in the input signal, and means for simultaneously detecting a first signal portion of said second derivative signal exceeding a positive threshold and a second signal portion of said second derivative signal exceeding a negative threshold, whereby said detection circuit detects a valid transition when a zero crossing of said second derivative signal is surrounded by said first signal portion and said second signal portion.

22. An apparatus according to claim 21 wherein said positive and negative thresholds have the same magnitude.

23. An apparatus according to claim 21 wherein said detection circuit comprises first delay means coupled to said second derivative signal and outputting a first delayed signal, second delay means coupled to said first delay signal and outputting a second delayed signal, a first comparator having inputs coupled to said positive threshold and to said second derivative signal, a second comparator having inputs coupled to said negative threshold and to said second delayed signal, a third comparator having inputs coupled to said first delayed signal and to a ground signal, a first AND gate connected to outputs from each of said first comparator, said second comparator, and said third comparator, a fourth comparator having inputs coupled to said negative threshold and to said second derivative signal, a fifth comparator having inputs coupled to said positive threshold and to said second delayed signal, a sixth comparator having inputs coupled to said first delayed signal and to a ground signal, and a second AND gate connected to outputs from each of said fourth comparator, said fifth comparator, and said sixth comparator.

24. An apparatus for detecting the occurrence of transitions in an input signal comprising:

a plurality of sample-and-hold circuits for taking samples of the input signal, a double differentiator circuit generating an approximate second derivative signal of the input signal by algebraically combining said samples, said double differentiator circuit having a plurality of inputs, a controller for selectively coupling said sample-and-hold circuits to the inputs of said double differentiator circuit, and a detection circuit for detecting zero crossings of said approximate second derivative signal.

25. An apparatus according to claim 24 wherein said sample-and-hold circuits comprise cells of an analog shift register.

26. An apparatus according to claim 24 wherein said controller selectively couples the input signal to an input of said double differentiator circuit in generating said approximate second derivative signal.

27. An apparatus according to claim 24 further comprising a single differentiator circuit generating an approximate first derivative signal of the input signal by taking the difference between two samples of the input signal, said single differentiator circuit having a plurality of inputs, and said controller selectively coupling said sample-and-hold circuits to the inputs of said single differentiator circuit, wherein said second derivative zero crossings are indicative of valid transitions in the input signal only during time periods when said approximate first derivative signal exceeds a threshold.

28. An apparatus according to claim 27 wherein said controller selectively couples the input signal to an input of said single differentiator circuit in generating said approximate first derivative signal.

29. An apparatus according to claim 24 wherein said double differentiator circuit algebraically combines three of said samples by subtracting twice a value of one sample from a sum of a preceding sample and a following sample.

30. A system for detecting the occurrence of transitions in an input signal comprising:

a plurality of delay elements coupled in series for providing delayed representations of the input signal, a double differentiator circuit generating an approximate second derivative of the input signal by algebraically combining said delayed representations, a single differentiator circuit generating an approximate first derivative signal of the input signal in time alignment with said approximate second derivative, and a zero crossing detector for detecting zero crossings of said approximate second derivative indicative of transitions in the input signal, said zero crossing detector further comprising a threshold circuit for generating a threshold level whereby zero crossings in said second derivative signal are detected when said first derivative exceeds said threshold level.

31. A system according to claim 30 wherein said double differentiator circuit algebraically combines said delayed representations by subtracting twice the value of one delayed representation from a sum of a preceding delayed representation and a following delayed representation.

32. A system according to claim 30 wherein said double differentiator circuit has a periodic frequency response and relatively constant group delay, and wherein said delay elements have a delay period selected such that a first roll-off region of said periodic frequency response occurs immediately beyond the expected input frequency bandwidth.

33. A system according to claim 30 wherein said double differentiator circuit algebraically combines the input signal with said delayed representations to generate said approximate second derivative signal.

34. A system according to claim 30 wherein at least one of said delay elements comprises a resistance, wherein said resistance is selected so as to provide delay response equalization to compensate for phase nonlinearities in said system.

35. An apparatus for detecting the occurrence of transitions in an input signal comprising:
 a scanner having a plurality of range settings,
 a plurality of delay elements coupled in series for providing delayed representations of the input signal, wherein at least one of said delay elements is adjustable to match a particular range setting,
 a double differentiator circuit generating an approximate second derivative of the input signal by algebraically combining said delayed representations, and
 a zero crossing detector for detecting zero crossings of said approximate second derivative indicative of transitions in the input signal.

36. An apparatus according to claim 35 wherein said adjustable delay element is a ladder transconducting amplifier.

37. An apparatus according to claim 35 wherein said adjustable delay element is dynamically adjustable.

38. A method for detecting the occurrence of valid zero crossings in an input signal comprising the steps of:
 detecting zero crossings in an input signal,
 detecting a first signal portion preceding the zero crossing, said first signal portion exceeding a first threshold, and
 simultaneously detecting a second signal portion following the zero crossing, said second signal portion having opposite polarity from said first signal portion and exceeding a second threshold.

39. A method for determining occurrence of transitions in an input signal comprising the steps of:
 obtaining samples of the input signal separated by fixed intervals in time,
 approximating a second derivative of the input signal from said samples, and
 detecting a zero crossing of said second derivative by simultaneously detecting in said second derivative a first signal portion exceeding a first predetermined threshold and a second signal portion of opposite polarity exceeding a second predetermined threshold, said first signal portion and said second signal portion surrounding said zero crossing.

40. A method according to claim 39 wherein said step of simultaneously detecting in said second derivative a first signal portion and a second signal portion of opposite polarity comprises the steps of
 comparing said second derivative with said first predetermined threshold and said second predetermined threshold, and
 comparing a delayed representation of said second derivative signal with the inverse of said first predetermined threshold and the inverse of said second predetermined threshold.

41. A system for detecting the occurrence of transitions in an input signal comprising:
 a plurality of delay elements coupled in series for providing delayed representations of the input signal,
 a double differentiator circuit generating a third order or higher order approximation of a second derivative of the input signal by algebraically combining at least a plurality of said delayed representations, and
 a zero crossing detector for detecting zero crossings of said approximate second derivative indicative of transitions in the input signal.

* * * * *

UNITED STATES PATENT AND TRADEMARK OFFICE
CERTIFICATE OF CORRECTION

PATENT NO. : 5,463,211

DATED : October 31, 1995

INVENTOR(S) : ARENDS, Thomas C. et al.

It is certified that error appears in the above-indentified patent and that said Letters Patent is hereby corrected as shown below:

Column 9, line 66, delete "X12" and insert -- X11 --.

Column 13, line 9, delete "assumed the" and replace with -- the assumed --.

<u>In the Claims:</u>

Claim 13, column 20, line 48, after "said" and before "first" insert -- approximate --.

Claim 13, column 20, line 49, after "derivative" delete "signal".

Signed and Sealed this

Twenty-sixth Day of March, 1996

*Attest:*

BRUCE LEHMAN

*Attesting Officer*     *Commissioner of Patents and Trademarks*